United States Patent [19]
Bamford

[11] Patent Number: 5,568,211
[45] Date of Patent: Oct. 22, 1996

[54] IMPACT ACTIVATED TRIGGERING MECHANISM FOR A CAMERA MOUNTED IN A VEHICLE

[75] Inventor: Robert M. Bamford, Glendale, Calif.

[73] Assignee: Terry D. Scharton, Santa Monica, Calif.; a part interest

[21] Appl. No.: 419,092

[22] Filed: Apr. 10, 1995

[51] Int. Cl.$^6$ ............ G03B 17/38; G03B 29/00
[52] U.S. Cl. ............ 396/429; 396/502
[58] Field of Search ............ 354/76, 266; 352/132, 352/174; 200/61.45 R, 61.53

[56] References Cited

U.S. PATENT DOCUMENTS

| | | |
|---|---|---|
| 2,876,688 | 4/1953 | Laue ............ 352/132 |
| 2,879,349 | 3/1959 | Thompson . |
| 2,888,530 | 5/1959 | Horton . |
| 3,332,060 | 7/1967 | Liljequist . |
| 3,407,667 | 10/1968 | Doeringsfeld . |
| 3,515,472 | 6/1970 | Schwitzgebel ............ 352/132 |
| 3,836,738 | 9/1974 | Baland . |
| 5,011,182 | 4/1991 | Husby et al. . |
| 5,134,255 | 7/1992 | Tetrault et al. . |
| 5,262,813 | 11/1993 | Scharton ............ 354/266 |

Primary Examiner—A. A. Mathews
Attorney, Agent, or Firm—Thomas I. Rozsa; Tony D. Chen

[57] ABSTRACT

An improved impact activated triggering mechanism for a camera which is mounted on a rear-view mirror of a vehicle. The impact activated triggering mechanism responds to inertial forces from any horizontal direction. Upon sudden impact or deceleration an enclosed inertia member moving relative to the camera causes the release of a spring which directly or indirectly actuates the shutter in the camera.

55 Claims, 7 Drawing Sheets

IMPACT ACTIVATED TRIGGERING MECHANISM FOR A CAMERA MOUNTED IN A VEHICLE

BACKGROUND OF THE INVENTION

1. Field of The Invention

The present invention relates to the field of cameras. More particularly, the present invention relates to an impact activated triggering mechanism for a conventional disposable camera mounted on a rear-view mirror of a vehicle.

2. Description of The Prior Art

Generally, when taking a picture, personal attention is required to take a photographic picture of an object. When a vehicle collision occurs, there is almost no way for a driver to manually take a picture at the instant an accident has occurred. An impact actuated switch is required to trigger a camera.

In the prior art inertial switch category, various devices employ spring biased movable masses to open or close an electrical circuit or do mechanical work when the device is subjected to an acceleration. The typical impact sensor utilizes a movable mass that is biased to a normal position by compressed springs or magnetic attraction. The movable mass is often in the form of a spherical metal ball and is constrained to move through a closed chamber against the restraining force of the biasing means upon the chamber receiving a force from the proper direction.

The following seven (7) prior art patents were uncovered in the pertinent field of the present invention:

1. U.S. Pat. No. 2,879,349 issued to Thompson on Mar. 24, 1959 for "Safety Switch" (hereafter "the Thompson Patent");
2. U.S. Pat. No. 2,888,530 issued to Horton on May 26, 1959 for "Impact Responsive Camera For Automobiles" (hereafter "the Horton Patent");
3. U.S. Pat. No. 3,332,060 issued to Liljequist on Jul. 18, 1967 for "Vehicle Deceleration Signalling Apparatus" (hereafter "the Liljequist Patent");
4. U.S. Pat. No. 3,407,667 issued to Doeringsfeld on Oct. 29, 1968 for "Omnidirectional Inertial Trigger Apparatus" (hereafter "the Doeringsfeld Patent");
5. U.S. Pat. No. 3,836,738 issued to Baland on Sep. 17, 1974 for "Impact Switch With Inertia Operated Toggle Linkage Actuator Mechanism" (hereafter "the Baland Patent");
6. U.S. Pat. No. 5,011,182 issued to Husby et al. on Apr. 30, 1991 for "Velocity Change Sensor With Contact Retainer" (hereafter "the Husby Patent"); and
7. U.S. Pat. No. 5,134,255 issued to Tetrault et al. on Jul. 28, 1992 for "Miniature Acceleration Switch" (hereafter "the Tetrault Patent").

The Thompson Patent discloses an electrical safety switch. The safety switch serves to interrupt an electrical circuit in a vehicle, airplane or the like, in the event of an accident or impact. The safety switch includes a movable metal ball which is adapted to be moved from a predetermined position upon impact so that the electrical circuit will be interrupted.

The Horton Patent discloses a switch of impact type in an electrical circuit. It includes a base of a dielectric material, a permanent magnet which is a horse-shoe design, a steel ball, and a dish with the steel ball located within the dish. The steel ball is kept between the poles of the permanent magnet by the magnetic field between the poles. The magnetic attraction of the steel ball to the poles is intense enough to hold the steel ball in place. Upon impact, the steel ball would be thrown from its position in the center of the dish against the ring encircling the dish, and therefore the steel ball would be in contact with both the dish and the ring. The steel ball contacting both the dish and the ring would close the circuit. The intended, but not claimed, application of this device is the operation of a camera mounted in a vehicle. The switch would energize an electrical circuit causing an electromagnet to depress the push-button of the camera which actuates the shutter in the camera. The switch is mounted remotely from the camera which is mounted in back of the vehicle.

The Liljequist Patent discloses an inertia actuated electrical switching device and system responsive to changes in deceleration of a vehicle for varying the amount of light emitted from its rear warning lights. The deceleration sensitive arrangement is used to vary the current flow in an electrical circuit, which is a type utilizing a relatively freely movable mass forming an electrical bridge between two terminals in the circuit. The electrical circuit includes an elongated track, a mass being bias movable relative thereto in response to changes in velocity, and electrical resistance arranged so as to vary the electrical resistance interposed in the circuit dependent upon the relative position between the track and the mass.

The Doeringsfeld Patent discloses an omnidirectional acceleration sensor that will provide a unidirectional mechanical output. It includes a frame, a pivot pin, an arm member, a coil spring, and a spherical ball in a cup. When an upward inertial force is received, the spherical ball will tend to remain fixed as the frame moves away from it. The spherical ball will force the arm member to pivot about the pivot pin in a clockwise direction. Similarly, a lateral force causes the ball to move out of the cup so that the arm pivots. The inertial force results in a mechanical movement of both ends of the arm member that can be utilized to perform useful work. The device is specially designed for a munitions fuse.

The Baland Patent discloses an inertia switch assembly utilized with an electrical circuit. The inertia responsive switch includes an over center linkage system, switch terminals operatively arranged with the linkage system and effective to move between open and closed positions, and an inertia member operatively connected to the linkage system so as to effectuate an opening or closing of the switch terminals when the inertia responsive member moves relative to the linkage system upon impact or high deceleration of the switch. The switch is sensitive to uniaxial impacts. The switch closes to complete a circuit effective to actuate a transmitter that emits a signal. The switch has special utility in an automatic crash signal device for aircraft.

The Husby Patent discloses a velocity change sensor with a contact retainer. It relates to an accelerometer for sensing velocity changes particularly suited for passenger restraint systems in a motor vehicle for deploying an air bag. It includes a housing with contact blades and a contacting element. The contacting element is arranged to move toward the contact blades when a deceleration exceeding a threshold level is sensed. The contact retainer is provided to set the blades in a preselected position so that the blades are simultaneously contacted by the contacting element, thereby improving the response time of the accelerometer. The contact blades are serially connected in an electrical circuit which comprises a battery and an actuating mechanism. The actuating mechanism controls and deploys one or more air bags.

The Tetrault Patent discloses a miniature acceleration activated electrical switch. It relates to electrical acceleration activated switches which have a mass movable in a housing against a spring bias in response to an applied acceleration. The miniature acceleration activated switch is responsive to a relatively small axial acceleration in order to close normally open contacts in the switch, in the presence of large laterally directed accelerations on the switch. It includes a hollow cylindrical casing which is closed at one end and the other end is closed by a header having an insulated axial lead wire extending inwardly from the casing, and an electrically conductive ring secured peripherally to the casing. The casing has an internally conical guide sleeve which has a freely rollable massive ball. A piston in the guide sleeve carries a contact member spaced by an expanded coil spring from the lead wire. The piston moves axially against the spring bias such that the contact member contacts the lead wire to close the normally open circuit switch.

Most of the prior art inertial switch patents are designed for use with an electrical circuit. It will be desirable to eliminate the electrical output and rely entirely upon mechanical functions for impact activated triggering mechanism for a camera.

None of the prior art mechanical inertial switches are desireable for impact triggering of a vehicle camera. Most of the mechanical inertial switches require a very large impact for triggering, such as that associated with munitions or an aircraft impacting the ground at high velocities. Another category of inertial switches, mostly electrical, are designed to activate automobile air bags upon severe impacts. These are particularly designed to operate above some high threshold and to avoid false alarms. A vehicle camera trigger should be sensitive to less severe impacts.

The major design problem for a mechanical inertial trigger for a vehicle camera is that the trigger must provide a relatively large actuation force (in excess of one half pound is required to depress the camera shutter release button), but must be capable of activation by relatively low impact loads from any lateral direction on the order of less than one ounce.

In addition, a vehicle camera mechanical impact activated trigger should be designed for convenient location and mounted in the vehicle to facilitate service and manual operation by the vehicle occupants, while not interfering with other vehicle operations and uses.

One of the assignees of the present invention is the patentee of U.S. Pat. No. 5,262,813 issued to Scharton on Nov. 16, 1993 (hereafter "the '813 Patent"). The '813 Patent discloses an impact activated triggering mechanism for a camera mounted in a vehicle. The '813 Patent introduced a sliding motion for triggering of a camera which occurs in a high intensity impact. The impact is sensed by a sliding weight which is configured so that the deceleration or acceleration applied in any direction in a horizontal plane will move the camera relative to the sliding weight and trigger the camera.

The inventor of the present invention has made significant improvements on the '813 Patent, in which: (a) implementations have been identified which provide for more reliable operation when a desired acceleration threshold is exceeded and which reliably maintain the untriggered configuration when the desired acceleration threshold is not exceeded thus preventing incremental inadvertent triggering; (b) means of replacing the sliding motion with rolling motion to make the device more sensitive and repeatable due to less dependence on uncertain environment dependent coefficients of friction for low intensity impact, while sliding occurs for higher intensity impacts, have been defined; (c) means to make re-cocking easier have been defined; (d) means of alignment independent of the mirror back surface shape have been defined; (e) means of integrating the triggering mechanism with the mechanism of a camera have been defined; and (f) details of designs which minimize obstruction of the drivers view, provide chimney effect cooling, protect the camera mechanism from damage following triggering, provide an integral lens shield and enclose functional components for improved appearance have been described.

SUMMARY OF THE INVENTION

The present invention is an improved impact activated camera triggering apparatus for a vehicle. Many times accidents occur without any witnesses around, and oftentimes each driver blames the other for the accident. The objective of the present invention is to provide means to operate a conventional disposable camera, whereby a photographic picture will be taken automatically when a vehicle collision occurs.

The preferred embodiment of the present invention is a mechanical inertial triggering mechanism which is mounted within a mounting case. A conventional disposable wide-angle camera is placed inside the mounting case where the mounting case is removably attached to a rear-view mirror of a vehicle.

The present invention is capable of providing an actuation force in excess of half (½) a pound which is the force required to depress the shutter release button lever of commercially available disposable cameras. Yet the device is sensitive to small (threshold less than 4 g's) accelerations or decelerations in any lateral direction (where "g" is a standard unit equal to the free fall acceleration due to the earth's gravity: $g \approx 9.8$ m/s$^2$). The impact activated triggering mechanism will be responsive to a low intensity sudden impact from another vehicle, but will normally remain inactive during average jostling and jarring of the vehicle due to the road condition.

It is therefore an object of the present invention to provide an impact activated camera triggering apparatus which includes a mounting case, an impact activated triggering mechanism for use with a disposable camera, so that the impact activated triggering mechanism can be responsive to a low intensity sudden impact such as the one produced by a minor collision between two vehicles.

It is also an object of the present invention to provide an impact activated camera triggering apparatus without using electrical circuits, so that it can rely entirely upon mechanical functions for operating a camera.

It is an additional object of the present invention to provide an impact activated camera triggering apparatus which includes a mounting case for a disposable camera, in which the mounting case is removably mounted on a rear-view mirror of a vehicle so that the camera can record a collision, traffic light status, license plate, and the position of the vehicles relative to each other and the road, essentially at the instant of the collision. The camera will also be accessible for conventional manual operation.

It is a further object of the present invention to provide an impact activated camera triggering apparatus which utilizes a rolling motion in lieu of a sliding motion where practical, so that the sensitivity and reliability of the impact activated triggering mechanism is increased.

It is an additional object of the present invention to provide a mounting case which has means for indexing to the mirror side of a rear-view mirror, so that the angle of the mounting case is always preadjusted when clamped to the rear-view mirror independent to the shape of the back of the mirror.

It is also an object of the present invention to provide a long narrow soft tapering trigger spring which has a tapered width, which is widest in the middle and narrowest at its opposite ends, so that when the spring is pivoted at its middle point, the bending stress is uniformly distributed along the entire length of the trigger spring.

It is a further object of the present invention to provide a long narrow soft tapering trigger spring which actuates the tip of the shutter release button lever of a camera, so that less pressure is utilized and a stop is included which prevents damage to the shutter release button lever.

It is still a further object of the present invention to provide a single finger thrust reset mechanism, so that the impact activated triggering mechanism can be reset with a push of a button.

Described briefly, the present invention impact activated camera triggering apparatus incorporates the following five elements: (1) a trigger spring whose release actuates a visual image recording device; (2) a seismic mass; (3) means for supporting the seismic mass which prevents motion of the seismic mass relative to the support in the absence of a horizontal acceleration of the support exceeding a threshold value; (4) a device which releases the trigger spring when the support moves horizontally relative to the seismic mass; and (5) means for supporting the assembly of the first four elements and a visual image recording device in a preset orientation such that the recording device views a scene to be recorded when the acceleration occurs.

Elements 1 through 4 can be internal or external to the visual image recording device. The seismic mass can be in one or more pieces. The seismic mass can move relative to its support by a sliding motion or a rolling motion or a combination of the two motions. The seismic mass and release mechanism can be positioned for actuation in one or more steps.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
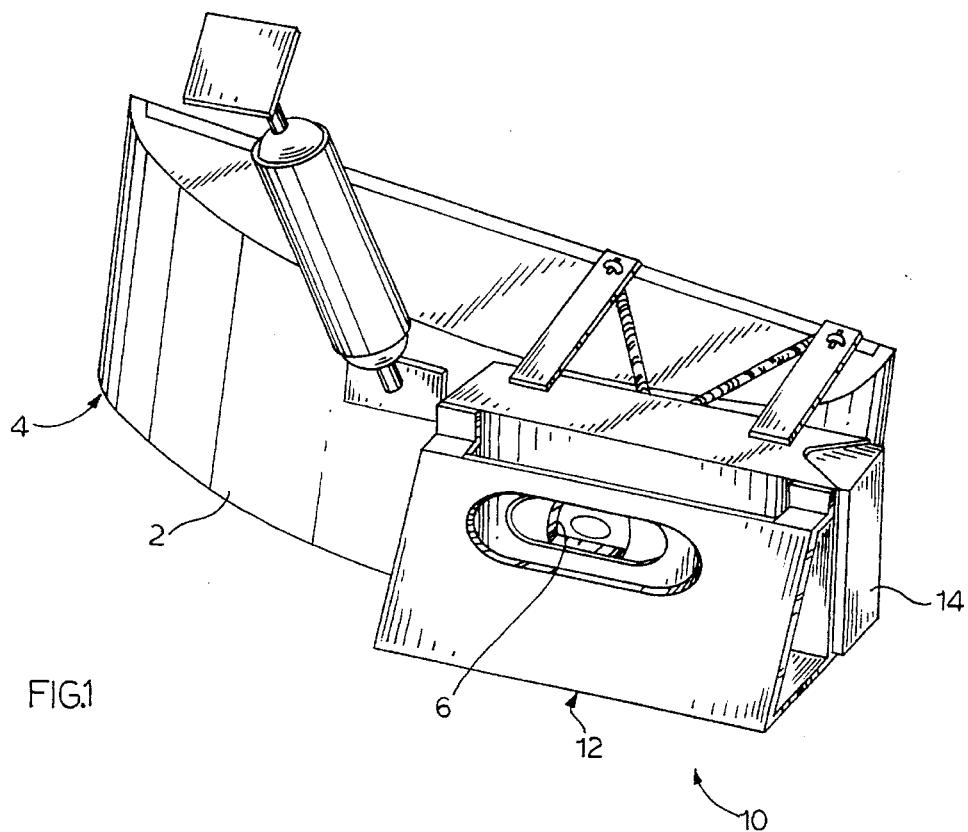
FIG. 1 is a perspective view of the present invention impact triggering camera apparatus removably mounted behind a rear-view mirror of a vehicle.
Figure 5:
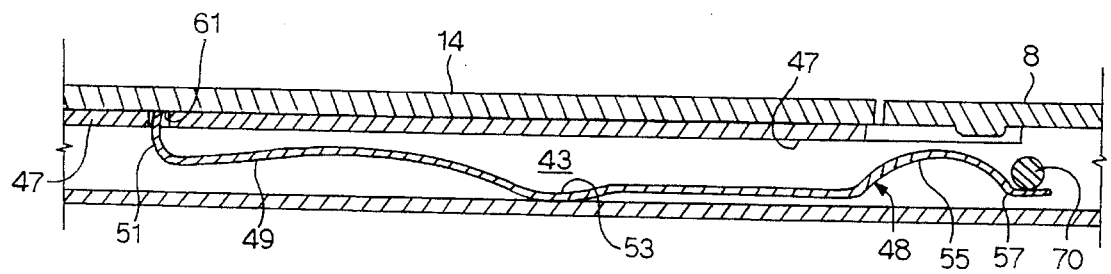
FIG. 5 is a partial cross-sectional view of a long narrow soft tapering trigger spring, showing the trigger spring latched by a transverse latching pin.
Figure 7:
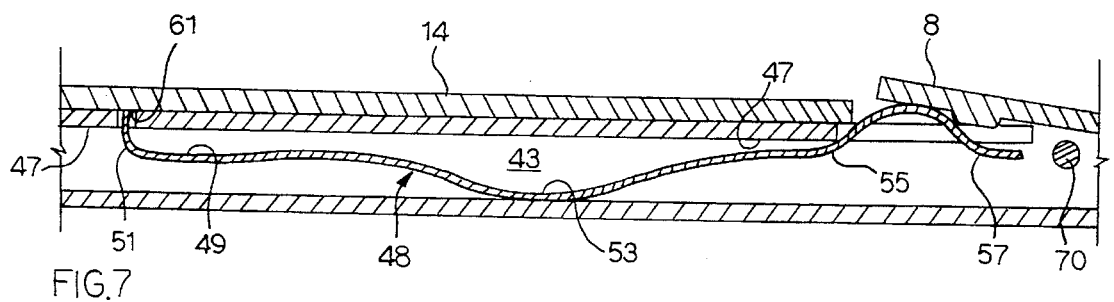
FIG. 7 is a partial cross-sectional view of the tapering trigger spring actuating the shutter release button lever of the camera.

Referring to FIG. 1, there is shown a perspective view of the present invention impact activated camera triggering apparatus 10 which is removably attached inside a vehicle (which may be a truck, a bus, an automobile, or any other type of vehicle) at a location between the back 2 of a rear-view mirror 4 and a front windshield for taking a photographic picture. The apparatus 10 includes a mounting case or means 12 that supports a conventional disposable wide-angle lens camera 14 or any other photographic device. The camera 14 includes conventional parts, e.g., a shutter release button lever 8 (shown in FIGS. 5 and 7), a wide angle lens 6, means for retaining a roll of film, and means to advance the roll of film, such as a thumb wheel, after an exposure and set the shutter for a next shot. The camera 14 may also be a conventional electronic visual image recording device. In either case, a device with a wide angle lens is preferred to enhance the field of view. The camera 14 is inserted within the mounting case 12, in which it slides after being inverted into the mounting case 12 such that the shutter release button lever 8 is pointing downward towards the ground or floor, as shown in FIGS. 5 and 7.

Figure 2:
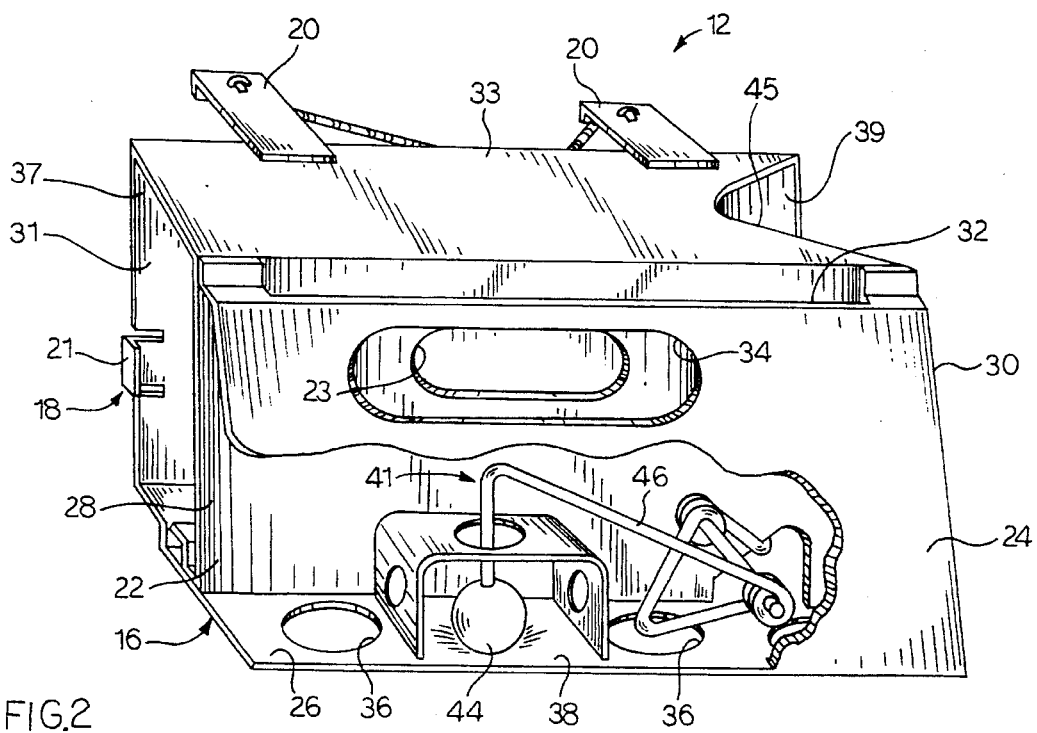
FIG. 2 is a front cutout perspective view of an impact activated triggering mechanism which is assembled in a mounting case.
Figure 8:
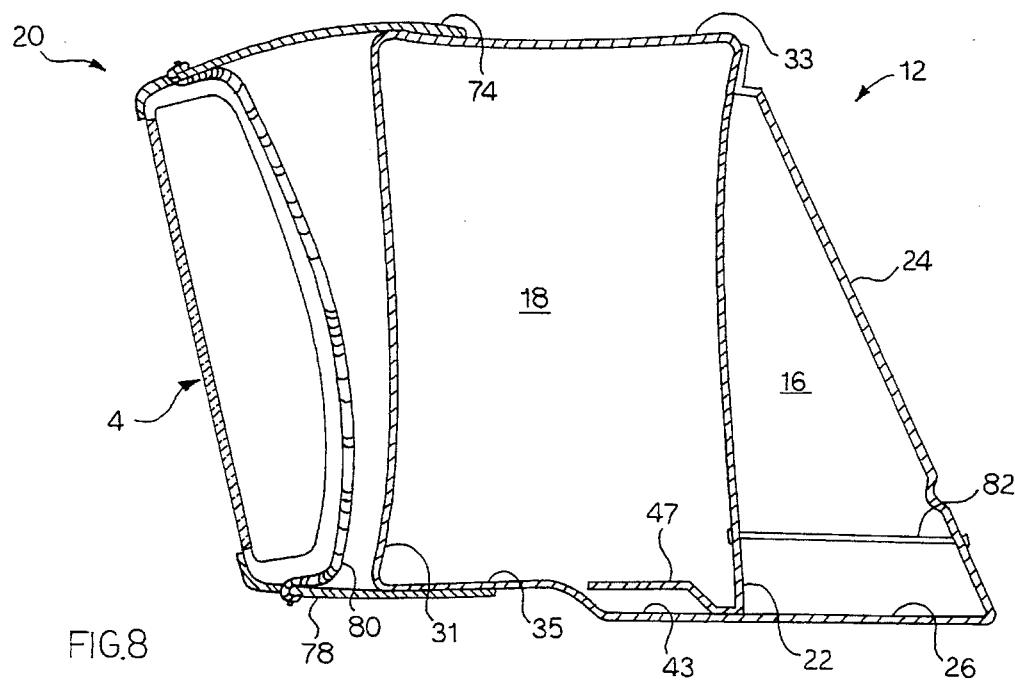
FIG. 8 is a side cross-sectional view of the mounting case and the rear-view mirror, showing the front, rear, top and bottom panels of the mounting case curved inwardly.

FIG. 2 shows a front cut-out perspective view of the mounting case 12. FIG. 8 shows a side cross-sectional view of the mounting case 12. Referring to FIGS. 2 and 8, there is shown at 12 the mounting case which includes a generally right triangular shaped front compartment 16, as shown in FIG. 8, which encloses the preferred embodiment of an impact activated triggering mechanism 41, a generally rectangular shaped rear camera compartment 18, and mounting means 20 for mounting behind the rear-view mirror 4 of the vehicle. The mounting case 12 may be made out of aluminum such as, e.g., 6061 T4 or any other suitable type of material.

The front and rear compartments 16 and 18 share a bowed shaped common panel 22 which is the back panel of the front compartment 16 and the front panel of the rear compartment 18. The common panel 22 has an elliptical shaped opening 23 therethrough. The rear compartment 18 includes a bowed shaped back panel 31, a top panel 33, a bottom panel 35, a first end opening 37, and a second end opening 39. The bowed shaped back panel 31 is generally parallel to the bowed shaped common panel 22, where both of the bowed shaped portions of the panels 31 and 22 are facing each other to provide a squeezing effect, as shown in FIG. 8, so that the camera 14 is held within the rear compartment 18, as shown in FIG. 1. The end openings 37 and 39 may have means for preventing the camera 14 from sliding out of the rear compartment 18. The means may be a flange 21 (shown only at end opening 37) which is integrally connected thereon, as shown in FIG. 2. The end opening 39 is utilized for inserting or removing the camera 14 from the mounting case 12 for conventional manual operation. The flange (not shown) at the end opening 39 may be disabled to allow insertion or removal of the camera 14.

Figure 4:
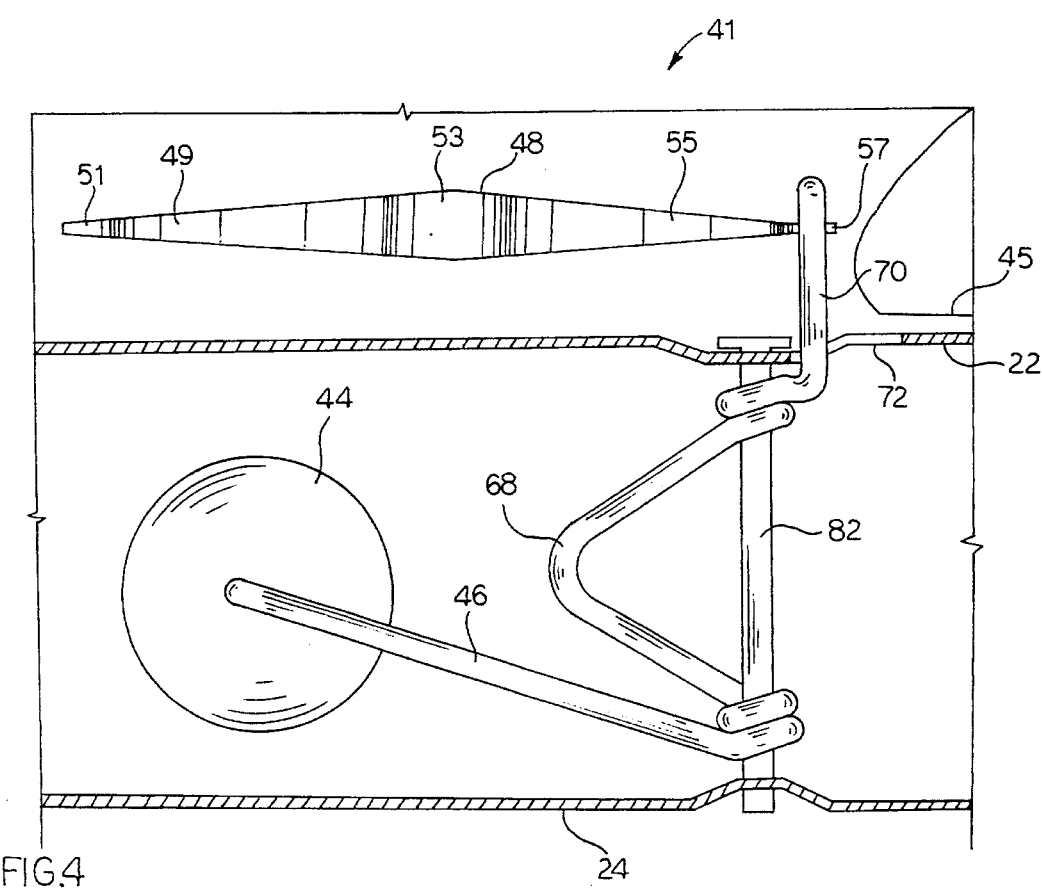
FIG. 4 is a partial top plan view of the impact activated triggering mechanism in the cocked condition.

The top panel 33 and the bottom panel 35 of the rear compartment 18 each has a generally rounded triangular or half-circle shaped cut-out 45 at the end opening 39 which provides a clearance for the user to use his or her fingers to hold the camera 14 for insertion or removal. The bottom cut-out 45 shown in FIG. 4 is also used for accessing the shutter release button lever 8.

Referring to FIGS. 4, 5, 7 and 8, the bottom panel 35 of the rear compartment 18 has a longitudinal step-down section 43. A longitudinal cover plate 47 is mounted within the step-down section 43 such that it covers the entire step-down section 43 and leaves an open space or gap for mounting a long narrow soft tapering trigger spring 48.

FIG. 5 shows the trigger spring 48 in its cocked position. FIG. 7 shows the trigger spring 48 in its uncocked position where the trigger spring 48 is pressing on the shutter release button lever 8. Referring to FIGS. 4, 5 and 7, the trigger spring 48 comprises a tapering proximal section 49 with a narrow proximal end 51, a wide middle section 53, and a tapering distal section 55 with a narrow distal end 57. The trigger spring 48 is pivoted at its middle point. In this configuration, the bending stress in the trigger spring 48 is relatively uniformly distributed along its length. The two ends 51 and 57 of the trigger spring 48 are extending upwardly while the wide middle section 53 is extending downwardly and abutting against the bottom surface of the step-down section 43, as shown in FIGS. 5 and 7, and provides a preset force on the trigger spring 48 to press the shutter release button lever 8. The proximal end 51 of the trigger spring 48 is anchored to the cover plate 47 by any suitable means, such as for example, the tip of the proximal end 51 enters into a detent hole 61. Rotation about such a detent can be prevented by a guide at the distal end 57. The distal end 57 of the trigger spring 48 protrudes upwardly through an end opening on the cover plate 47 when it is released.

Referring to FIGS. 2 and 8, the front compartment 16 has a slanted front panel 24, a bottom panel 26, a first end opening 28, and a second end opening 30. The slanted front panel 24 has a slotted top end 32 and a centrally located elliptical shaped opening 34 therethrough. The two elliptical shaped openings 34 and 23 of the front and common panels 24 and 22 are respectively aligned and parallel to each other for accommodating the field of view of the wide angle lens of the camera 14, when the camera 14 is installed within the rear compartment 18. The bottom panel 26 of the front compartment 16 has multiple apertures 36 and a detent section 38 which is located between a respective two of the multiple apertures 36. The multiple apertures 36 and the slotted top end 32 provide a chimney effect for cooling the camera 14. The detent section 38 has a central cavity 40 (see FIG. 6) therethrough.

Figure 3:
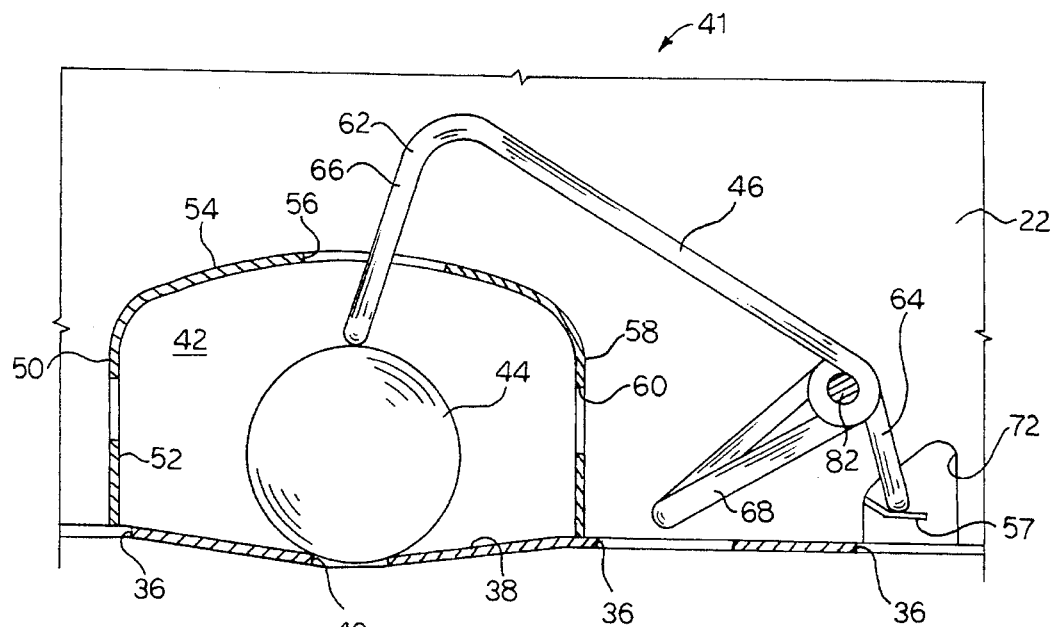
FIG. 3 is a partial cross-sectional view of the impact activated triggering mechanism in the cocked condition, showing a ball chamber where a rolling ball is located.
Figure 6:
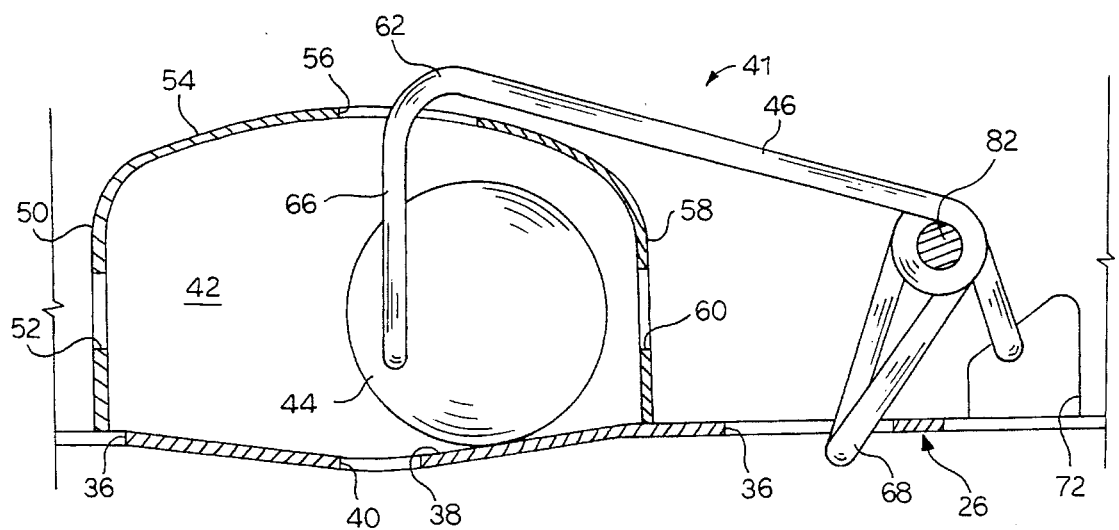
FIG. 6 is a partial cross-sectional view of the impact activated triggering mechanism in the released condition.

FIG. 3 shows a partial cross-sectional view of the impact activated triggering mechanism 41 in its cocked position. FIG. 4 shows a partial top plan view of the impact activated triggering mechanism 41 also in its cocked position. FIG. 6 shows a partial cross-sectional view of the impact activated triggering mechanism 41 in its released or uncocked position. Referring to FIGS. 3, 4 and 6, the impact activated triggering mechanism 41 includes a chamber 42 for retaining a seismic mass 44, a trigger lever arm 46, and the long narrow soft tapering trigger spring 48. The seismic mass 44 is generally a spherical rolling ball. The deceleration or acceleration is associated with a low intensity sudden impact. The low intensity impact is sensed by the rolling ball 44 which is above the central cavity 40 of the detent section 38. The detent section 38 is configured so that the low intensity impact deceleration or acceleration applied in any horizontal direction will move the rolling ball 44 relative to its cocked position. The central cavity 40 defines a threshold horizontal load and prevents inadvertent and incremental triggering.

The chamber 42 has a first end wall 50 with an opening 52, a top wall 54 with a top opening 56, and a second end wall 58 with an opening 60. These parts together with parts of the slanted front panel 24 and the common panel 22 and the entire detent section 38 of the bottom panel 26 of the front compartment 16 form the chamber 42. The rolling ball 44 is placed in and retained within the chamber 42 so that it is limited to a horizontal plane movement and responsive to inertial forces. One of the unique features of the present invention is that the detent section 38 has a conical surface which provides an automatic cocking return mechanism for centering and allowing the rolling ball 44 to be reset in its cocked position.

As shown in FIG. 3, the trigger lever arm 46 has a distal end 62 and a proximal end 64. The distal end 62 forms a trigger lever pin 66 which extends down through the top opening 56 of the chamber 42 and rests on top of the rolling ball 44, as shown in FIGS. 2, 3 and 4. In this position, the impact activated triggering mechanism 41 is cocked and is ready to trigger the camera. When the rolling ball 44 rolls in any horizontal direction off the central cavity 40 of the detent section 38, the trigger lever pin 66 slides off the top of the rolling ball 44. The bottom tip of the trigger lever pin 66 is rounded to prevent premature termination of motion. The proximal end 64 of the trigger lever arm 46 is wrapped around a pivot shaft or axle 82 and forms a reset trigger lever 68 and a transverse latching pin 70. The pivot shaft 82 is mounted transversely between the front panel 24 and the common panel 22 at a location remote from the rolling ball 44. The reset trigger lever 68 rests above one of the multiple apertures 36 and is located outside the chamber 42. The latching pin 70 extends through an opening 72 on the common panel 22 and into the rear compartment 18 for engaging with the distal end 57 of the trigger spring 48. The reset trigger lever 68 is used for facilitating the cocking of the tapering distal section 55 of the trigger spring 48 by latching the transverse latching pin 70 of the trigger lever arm 46 over the narrow distal end 57 of the trigger spring 48 to prevent the tapering distal section 55 from pressing up on the shutter release button lever 8 of the camera 14 prematurely.

The sensitivity and threshold may be varied by changing the diameter of the central cavity 40 of the detect section 38 relative to the diameter of the rolling ball 44. Also, the sensitively and threshold may be varied by changing the weight of the rolling ball 44 relative to the force the spring applies to the lever by varying the horizontal projection of the length of the trigger lever arm 46 relative to the distance from the normal to the trigger spring distal end 57 at the latching pin 70 of the trigger lever arm 46 from the pivot axis.

Cocking is accomplished by first removing the camera 14 from the rear compartment 18 of the mounting case 12 and applying a light downward pressure on the distal section 55 of the trigger spring 48. Secondly, applying a light upward pressure on the reset trigger lever 68 until the latching pin 70 is above and latches the distal end 57 of the trigger spring 48 and the trigger lever pin 66 is above the rolling ball 44. Gravity will allow the rolling ball 44 to settle above the central cavity 40 of the detent section 38. Thirdly, releasing the upward pressure on the reset trigger lever 68 so that the trigger lever pin 66 of the trigger lever arm 46 will rest on top of the rolling ball 44.

The result of conducting a moment balance on the trigger lever arm 46 is that the pushing down force exerted by the trigger lever pin 66 of the trigger lever arm 46 on the rolling ball 44 is much less than the pushing up force exerted by the tip of the distal end 57 of the trigger spring 48 on the latching pin 70. Due to the softness of the trigger spring 48 the load when latched is little more than that required to trigger the camera. All this increases the sensitively.

When the impact activated camera triggering apparatus 10 is mounted within the vehicle, the central cavity 40 of the detent section 38 can move from under the rolling ball 44 in response to the inertial forces in the horizontal plane upon low intensity sudden impact on the vehicle from any horizontal direction, which drops the trigger lever pin 66 of the trigger lever arm 46 off from the rolling ball 44. The latching pin 70 of the trigger lever arm 46 releases the distal end 57 of the trigger spring 48 and the distal section 55 in turn presses on the tip of the shutter release button lever 8 of the disposable camera 14, to thereby automatically take the photographic picture at the moment of sudden impact. One of the advantages of the present invention is that the trigger spring 48 is pressing on the tip of the shutter release button lever 8, therefore a much smaller force is required and the mechanism is more sensitive. It also leaves the shutter release button lever 8 accessible to manually trigger the camera while it is installed in the mounting case 12.

Another advantage of the present invention is that the trigger spring 48 is prevented by the bottom panel 47 from pressing the shutter release button lever 8 beyond its normal travel once a picture is taken, as shown in FIG. 7. This prevents permanent damage to the shutter release button lever 8.

Figure 9:
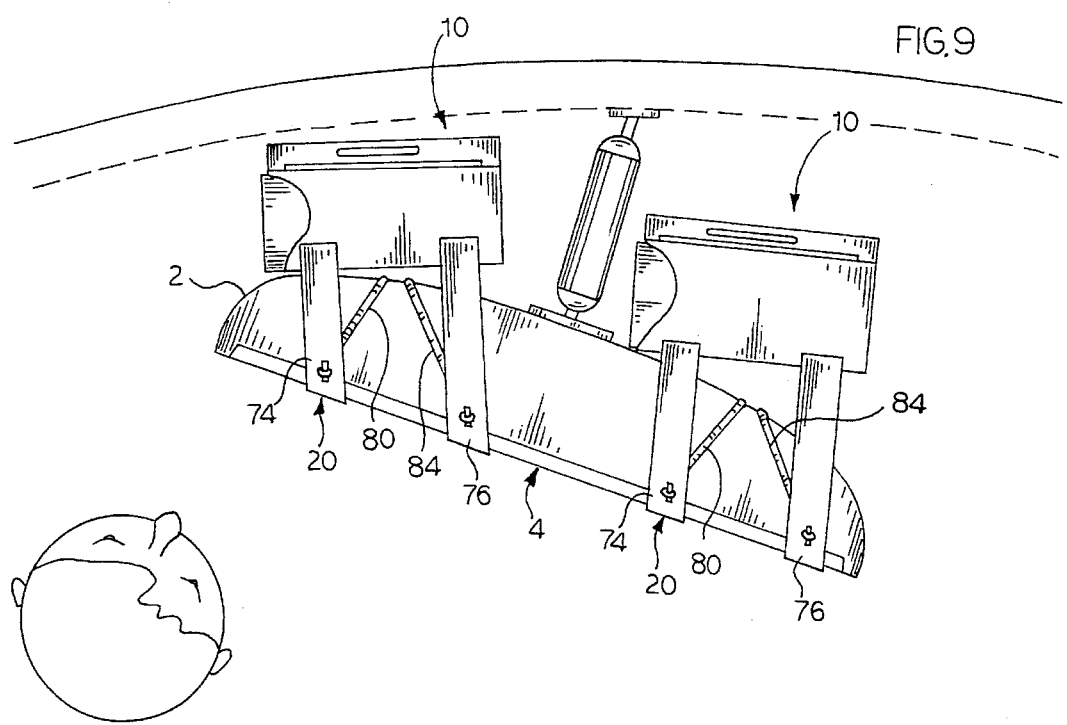
FIG. 9 is a top plan view of the impact triggering camera apparatus removably mounted behind a rear-view mirror of a vehicle, showing how the mounting case is indexing to the front side of the rear-view mirror.

Referring to FIGS. 8 and 9, there is shown at 20 the mounting means for the impact activated camera triggering apparatus 10. The mounting means 20 has means for mounting the mounting case 12 behind the rear-view mirror 4 and indexing to the mirror side of the rear-view mirror 4. The mounting means 20 includes two top protruding arms 74 and 76, and a bottom protruding arm 78. The protruding arms 74, 76 and 78 are extending out from the top and bottom panels 33 and 35 beyond the back panel 31 of the rear compartment 18. Elastic bands 80 and 84 are provided and attached to the protruding arms 74, 76 and 78 for holding the mounting case 12 behind the rear-view mirror 4 and indexing the mounting case 12 to the mirror side of the rear-view mirror 4. The top protruding arm 76 has a greater length than the other top protruding arm 74 and the length of the lower arm is less than the average of the upper arms 74 and 76 so that the angle of the mounting means 20 is preadjusted to clamp to the mirror 4. This allows for the possibly in an appropriate vehicle for the mounting case 12 to be attached on either side of the rear-view mirror 4, as shown in FIG. 9. The mounting case 12 is always indexed with the mirror side of the rear-view mirror 4 because the elastic bands 80 and 84 preload the protruding arms 74, 76 and 78 to that side of the mirror. This ensures that the mounting case 12 always has a correct orientation for the nominal position of the mirror. The impact activated camera triggering apparatus 10 may also be attached behind the rear-view mirror 4 with a double sticky tape, mating hook and loop fasteners such as Velcro®, magnets, clips or any other suitable attachment means. It is located between the rear-view mirror 4 and the front windshield. This is an ideal place to mount the impact activated camera triggering apparatus 10 because it provides a good front view at the instant of any type of collision. It is also out of the driver or passengers' way and view. The impact activated camera triggering apparatus 10 will not hit the passenger in case of a collision and it is located within easy access for manual operation by the driver or passenger.

It will be appreciated that the present invention is not limited to the mounting position behind the rear-view mirror. It is emphasized that while behind the rear-view mirror 4 is the preferred mounting location, it is also within the spirit and scope of the present invention to have a multiplicity of mounting locations including on the dashboard. In addition, it is within the spirit and scope of the present invention for one skilled in the art to mount the impact activated camera triggering apparatus 10 at different locations within the vehicle, including adjacent the rear windshield to be able to take a photograph of the situation in which the vehicle is rear-ended.

Figure 10:
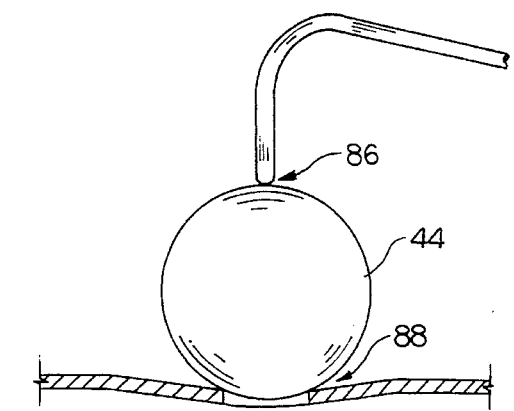
FIG. 10 is a partial cross-sectional view of the seismic mass of the impact activated triggering mechanism, in the form of a single rolling ball where there is both a sliding motion at one location and a rolling motion at another location.

Referring to FIG. 10, there is shown how the spherical rolling ball 44 reduces friction and induced resistance to motion of the rolling ball 44 relative to the mounting case. In the preferred embodiment, the rolling motion is at location 88 and the sliding motion is at location 86. Unlike a sliding mass which can only slide at both interfaces, the rolling mass has a much smaller and more repeatable resistance to motion.

Figure 10A:
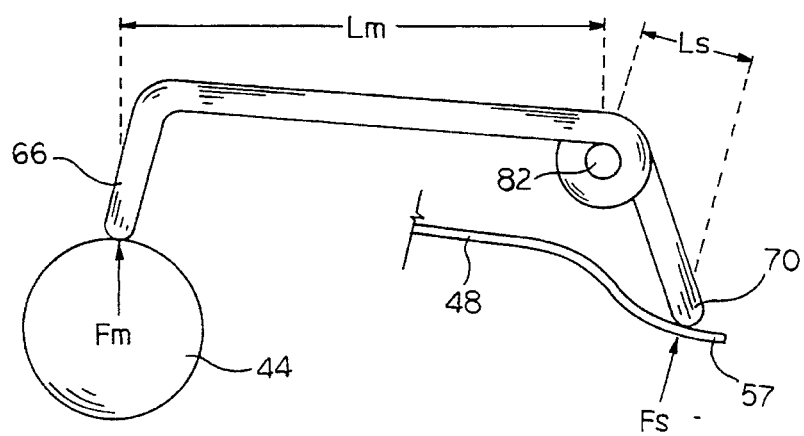
FIG. 10A is a partial perspective view of the present invention impact activated triggering mechanism, shown prior to triggering of the impact activated triggering mechanism and in the absence of friction the force applied by the seismic mass to the trigger lever pin times the horizontal projection of the distance from that contact to the trigger lever pivot axis is equal to the force applied by the distal end of the trigger spring to the trigger lever latching pin times the distance from a normal to that contact to the trigger lever pivot axis.

Referring to FIG. 10A, prior to triggering and in the absence of friction the force applied by the rolling ball 44 to the trigger lever pin 66 times the horizontal projection of the distance from that contact to the trigger lever pivot axis 82 is equal to the force applied by the distal end 57 of the trigger spring 48 to the trigger lever latching pin 70 times the distance from a normal to the contact to the trigger lever pivot axis 82 ($F_m \times L_m = F_s \times L_s$). If W is the weight of the rolling ball 44 reducing $F_s \times L_s/(L_m \times W)$ makes the mechanism more sensitive to trigger. The force applied by the rolling ball 44 is upward. The force applied by the trigger spring 48 is upward if the points of load application are on the opposite side of the pivot axis but downward if they are on the same side. On reduction of force from the rolling ball 44, due to motion of the rolling ball 44 relative to the trigger lever latching pin 70, there is an unbalanced load on the trigger lever which causes it to rotate. In the cases of spring contact on the opposite side and below the axis or on the same side and above the axis the distance from the normal to the spring at that contact to the axis will increase with rotation. The converse is true for the other two cases. In all cases friction at the interfaces inhibits rotation. Thus, for reliable operation with negligible chance of termination once actuation is initiated the spring contact should be of one of the two cases stated, not one of the other two cases.

The effect of friction is proportional to the distance from the plane of the contacts to the pivot axis. This should be as small as possible but must be sufficient at the trigger lever latching pin 70 to allow that pin 70 to move from the latched position to a position clear of the tip of the distal end 57 of the trigger spring 48 when the trigger lever rotates after the trigger lever pin 66 drops off the rolling ball 44.

For a ball making rolling contact with an edge the farther a vertical axis through the center of the ball is from the contact as a fraction of the diameter of the ball the larger the resistance to motion. A ball resting in a cavity with a locus of contact around the rim of the cavity has higher resistance to motion than a ball which has started to raise up out of the cavity, by rolling at the point of contact on the cavity rim, which results in reliable operation with negligible chance of termination once motion is initiated. The threshold level for operation can be made more sensitive to an impact from the side of a vehicle than forward and backward by using an elliptical planform locus of contact with the short axis of the ellipse side to side in the vehicle. If the locus of contact is planer it has a circular planform. If the planform is not circular the locus of the contact is non-planar.

Figure 11:
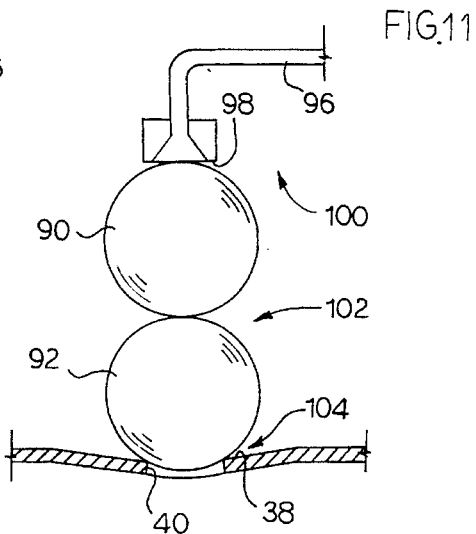
FIG. 11 is a partial cross-sectional view of an alternative embodiment of the seismic mass in the form of two rolling balls stacked on top of each other and utilizing rolling motion at three different locations.

Referring to FIG. 11, there is shown an alternative embodiment of the present invention which further reduces friction and improves repeatability. In this embodiment, two spherical rolling balls 90 and 92 are utilized. The ball ended trigger lever arm 46 (shown in FIGS. 2, 3, 4 and 6) is substituted with a trigger lever arm 96 which has a central cavity 98. A top spherical rolling ball 90 is stacked on top of another spherical rolling ball 92, while the bottom rolling ball 92 is retained within the central cavity 40 of the detent section 38, and the top rolling ball 90 is retained within the central cavity 98 of the trigger lever arm 96. In this embodiment, all sliding motion is eliminated so that the impact activated triggering mechanism utilizes only the rolling motion and will be more sensitive to and respond more repeatably to lateral movements as opposed to a device dependent on sliding motion. There are three arrows 100, 102 and 104 which are pointing at three different locations where the rolling motion occurs.

Figure 12:
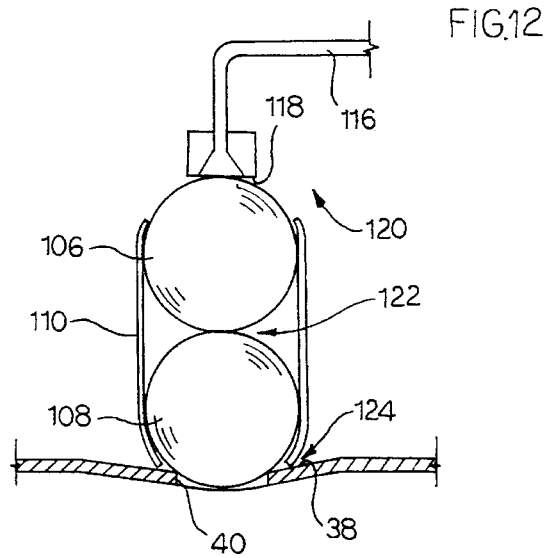
FIG. 12 is a partial cross-sectional view of another alternative embodiment of the seismic mass in the form of an open ended cylindrical housing loosely retaining two rolling balls and utilizing rolling motion at three different locations.

Referring to FIG. 12, there is shown another alternative embodiment of the present invention. This embodiment is similar to that shown in FIG. 11, but the two spherical rolling balls 106 and 108 are now retained within a loosely fitting open ended cylindrical shaped hollow housing 110. The spherical rolling balls 106 and 108 are stacked on top of each other such the bottom rolling ball 108 is retained within the central cavity 40 of the detent section 38, and the top rolling ball 106 is retained within the cavity 118 of the cavity ended trigger lever arm 116. In this embodiment, also the sliding motion is eliminated so that the impact activated triggering mechanism utilizes only the rolling motion and will be more sensitive to and respond more repeatably to lateral movements as opposed to the sliding motion. There are three arrows 120, 122 and 124 which are pointing at three different locations where the rolling motion occurs. The cylindrical housing 110 is used to allow a practical way to reposition the two rolling balls 106 and 108 after an impact.

Figure 13:
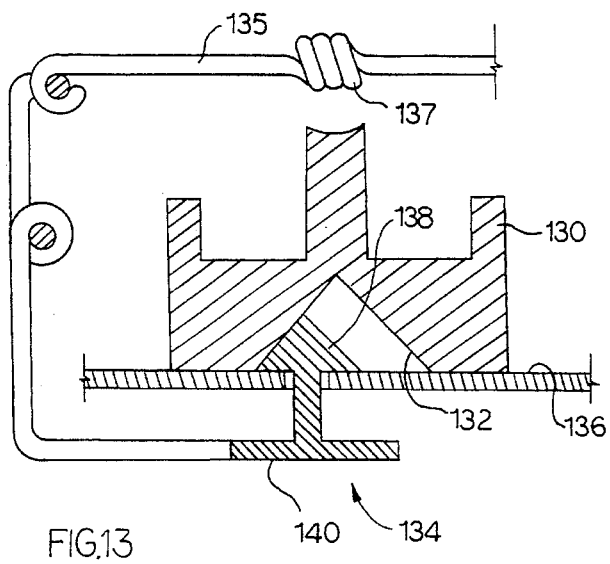
FIG. 13 is a partial cross-sectional view of still another alternative embodiment of the seismic mass in the form of a sliding mass and a reset button for single finger thrust resetting of the impact activated triggering mechanism.
Figure 14:
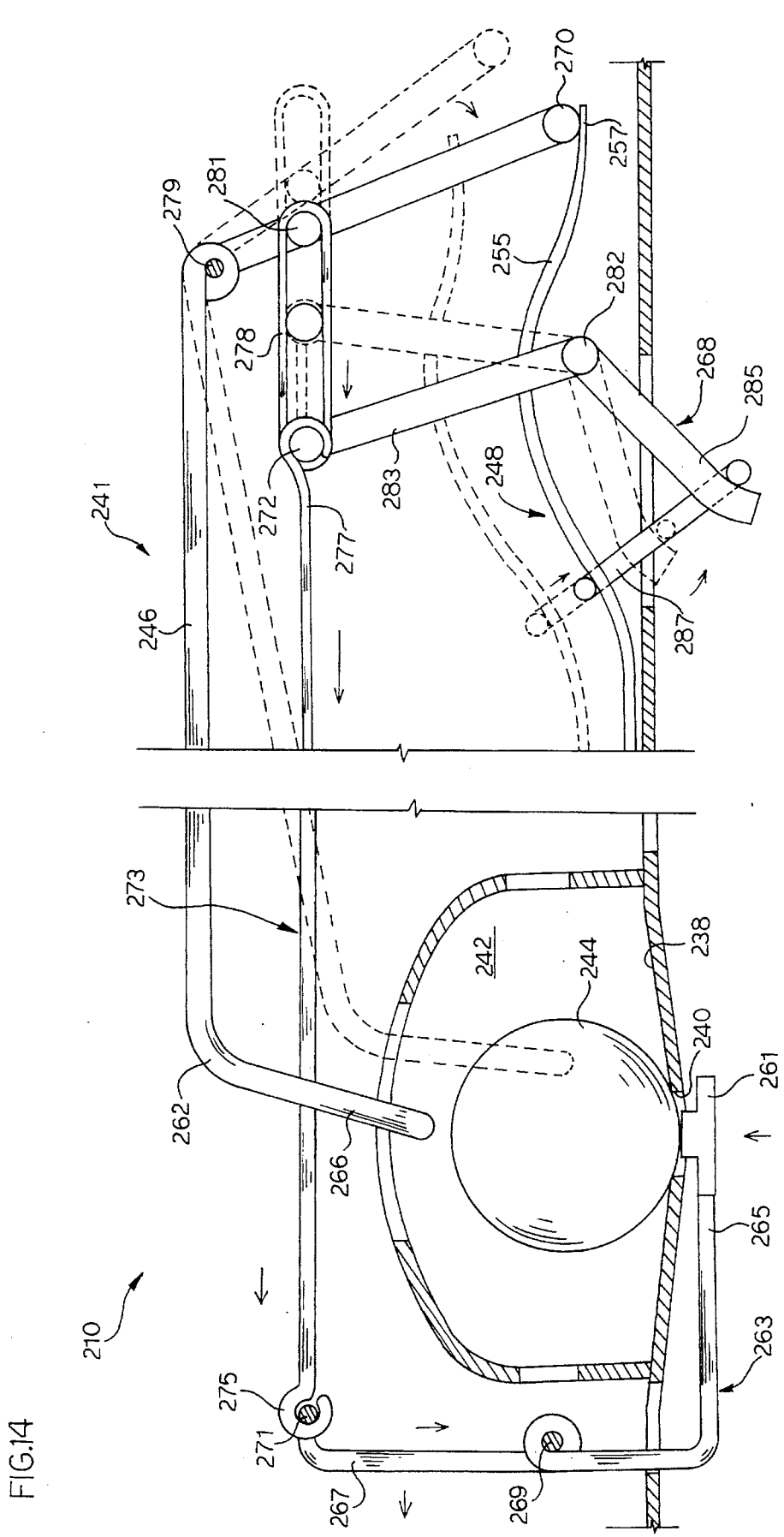
FIG. 14 is a partial cross-sectional view of another alternative embodiment of the impact activated triggering mechanism, showing a single finger thrust reset mechanism in the configuration just prior to completion of reset.

Referring to FIG. 13, there is shown still another alternative embodiment of the present invention. In this embodiment, only the sliding motion is utilized. It comprises a sliding mass 130 which is similar to the sliding mass of the '813 Patent. The sliding mass 130 can be used similarly to FIG. 14, where the sliding mass 130 can be cocked by a single finger thrust reset mechanism, as shown in FIG. 14. The only difference between this embodiment and FIG. 14 is that the reset tension element 135 comprises a spring means 137 for resetting the impact activated triggering mechanism, and the description thereof will not be described in detail since it is described in FIG. 14 and only the modified components will be described below.

The sliding mass 130 has a hollow conical cavity 132 which is utilized for resetting the sliding mass 130 in its cocked position. A reset button 134 is located underneath the sliding mass 130 and separated by a bottom panel 136. The reset button 134 has a conical shaped head 138 and a base 140. The head 138 is above the bottom panel 136 and conforms to and is smaller than the conical cavity 132 of the sliding mass 130. When the reset button 134 is pressed, the tip of the head 138 moves up towards the tip of the conical cavity 132 to reset the sliding mass 130 into its cocked position. Gravity returns the reset button 134 to its normal position.

Referring to FIG. 14, there is shown an alternative embodiment of the present invention impact activated camera triggering apparatus 210. The parts are numbered correspondingly with 200 added to each number. Only the modified components of the impact activated triggering mechanism 241 will be described in detail. In this embodiment, the impact activated triggering mechanism 241 can be reset by a single finger thrust reset mechanism.

The impact activated triggering mechanism 241 includes the same components as shown in FIGS. 1 through 10 of the preferred embodiment, including a chamber 242 for retaining a seismic mass 244 in the form of a generally spherical rolling ball, a trigger lever arm 246 whose proximal end includes a link shaft 279, and a long narrow soft tapering trigger spring 248. The chamber 242 comprises a detent section 238 with a central cavity 240 therethrough.

The single finger thrust reset mechanism includes a reset button 261 which is located underneath the detent section 238. A connecting bell-crank 263 has a first end 265 connected to the reset button 261 and a second end 267 wrapped around a first pivot axle 269 and extends upwardly to form a loop 271. A reset tension element 273 has a hook end 275 and a delay link end 277. The hook end 275 hooks to the loop 271 of the connecting bell-crank 263. The delay link end 277 hooks to a link shaft 272 of a reset trigger bell-crank 268.

The reset trigger bell-crank 268 comprises an upper arm 283 and a lower arm 285. The lower end of the upper arm 283 and the upper end of the lower arm 285 are attached to a pivot shaft or axle 282. The upper arm 283 terminates in the link shaft 272 to which the reset tension element 273 is hooked. The lower arm 285 of the reset trigger bell-crank 268 is linked with the distal section 255 of the trigger spring 248 by a spring link 287. A delay link 278 loosely joins a link shaft 281 of the trigger lever arm 246 and the link shaft 272 of the reset trigger bell-crank 268.

As illustrated from the drawing, cocking is accomplished by first applying a light upward pressure on the reset button 261 so that the loop 271 of the connecting bell-crank 263 is pulled to the left, as shown with arrows. The reset tension element 273 is also pulled to the left and starts to move the link shaft 272 of the reset trigger bell-crank 268, so that the lower arm 285 of the reset trigger bell-crank 268 moves down such that it pulls through the spring link 287 and the distal section 255 of the trigger spring 248 into the cocked position. Further travelling of the reset trigger bell-crank link shaft 272 will engage the delay link 278 and the link shaft 281 of the trigger lever arm 246 and force the trigger lever arm 246 to be positioned in its cocked position with the latching pin 270 above the distal end 257 of the trigger spring 248 and raises the trigger lever pin 266 allowing clearance for the rolling ball 244 to roll back above the central cavity 240 of the detent section 238. This is a delayed motion because the delay link 278 is not initially engaged with both the reset trigger bell-crank link shaft 272 and the trigger lever link shaft 281. This delay motion ensures that there is no interference between the trigger spring distal end 257 and the trigger lever latching pin 270. Gravity will allow the rolling ball 244 to settle on the central cavity 240 of the detent section 238 to reset the rolling ball 244 into its cocked position. The upward pressure on the reset button 261 is released so that the trigger lever pin 266 will rest on top of the rolling ball 244.

The dotted lines show the impact activated triggering mechanism 241 in its uncocked position after a picture is taken, and the solid lines show the impact activated triggering mechanism 241 in its cocked position ready to take the next picture.

Figure 15:
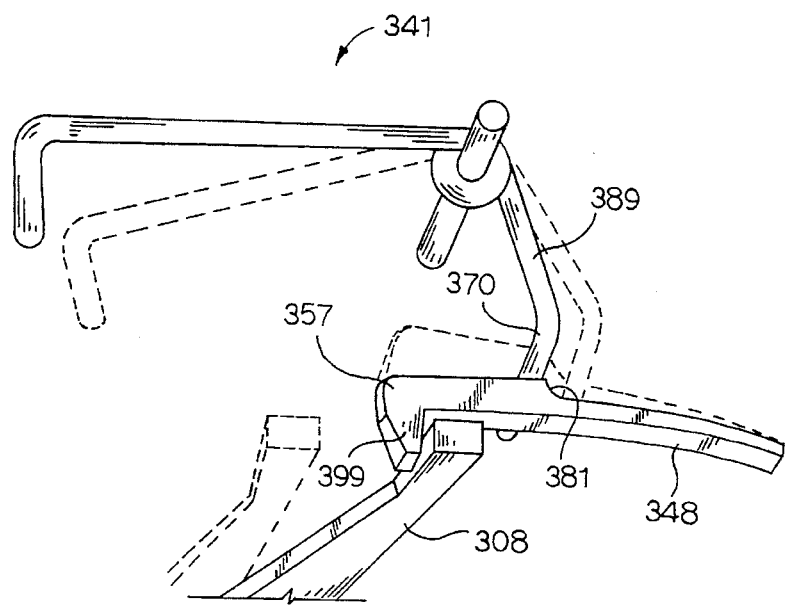
FIG. 15 is a partial perspective view of still another alternative embodiment of the impact activated triggering mechanism, showing a spring loaded lever whose motion initiates operation of a visual image recording device and the impact activated triggering mechanism.

Referring to FIG. 15, there is shown another alternative embodiment of the present invention impact activated triggering mechanism 341. The parts are numbered correspondingly with 300 added to each number. In this embodiment, the impact activated triggering mechanism 341 can be activated by a lever or element means 308 whose motion initiates operation. The lever 308 is spring loaded to induce motion. The distal end 357 of the trigger spring 348 comprises a lug 399 which latches the spring loaded lever 308 into a cocked configuration and prevents motion of the spring loaded lever 308 to initiate operation. When the trigger lever 389 is allowed to rotate, the latching pin 370 moves off the top of the trigger spring 348 and allows the spring loaded lever 308 to initiate operation of the visual image recording device. The trigger spring 348 has an offset 381 located on top and is needed for clearance after triggering has occurred.

The dotted lines show the impact activated triggering mechanism 341 in its uncocked or released position after a picture is taken, and the solid lines show the impact activated triggering mechanism 341 in its cocked position ready to take the next picture.

Figure 16:
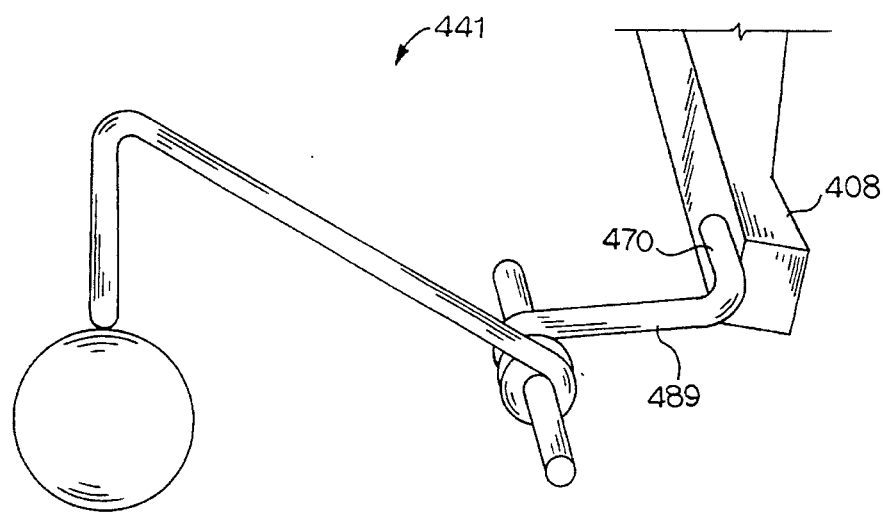
FIG. 16 is a partial perspective view of another alternative embodiment of the impact activated triggering mechanism, showing a spring loaded lever which is an internal part of a visual image recording device whose motion initiates operation of the integrated visual image recording device and the impact activated triggering mechanism.

Referring to FIG. 16, there is shown still another alternative embodiment of the present invention impact activated triggering mechanism 441. The parts are numbered correspondingly with 400 added to each number. In this embodiment, the impact activated triggering mechanism 441 can be activated by a lever or element means 408 which is an internal part of a visual image recording device. The lever 408 whose motion initiates operation is spring loaded to induce motion. The motion is prevented by the latching pin 470 of the trigger lever 489 in the cocked configuration, where the motion of the latching pin 470 allows the spring loaded lever 408 to directly initiate operation of the integrated visual image recording device and the triggering mechanism 441.

The present invention has many advantageous features including: (a) it reliably provides documentation of a vehicle collision; (b) it is inexpensive to manufacture; and (c) it can be used with conventional or low cost disposable wide-angle cameras.

Defined in detail, the present invention is an impact activated camera triggering apparatus used in combination with a disposable camera which has a wide angle lens and a shutter release button lever for taking a photographic picture, the apparatus removably attached inside a vehicle at a location between a back of a rear-view mirror and a front windshield, the rear-view mirror has a mirror side, the apparatus comprising: (a) a mounting case including a generally rectangular shaped rear compartment for retaining said camera and a generally right triangular shaped front compartment; (b) said rear compartment having a bowed shaped front panel with an elliptical shaped opening therethrough, a bowed shaped rear panel, a bottom panel, a top panel, a first end opening, and an opposite second end opening, the bowed shaped front and rear panels facing each other for securely locating said camera, the bottom panel having a longitudinal step-down section and a cut-out opening located adjacent to the second end opening for accessing said shutter release button lever and grasping said camera for insertion and removal; (c) a longitudinal cover plate mounted within said rear compartment and covering said step-down section of said rear compartment; (d) said front compartment having a slanted front panel, a bottom panel, a first end opening, and an opposite second end opening, the slanted front panel having a slotted top end and an elliptical shaped opening therethrough located centrally and aligned with and parallel to said opening of said front panel of said rear compartment, where both of the openings of the slanted front panel of said front compartment and said front panel of said rear compartment accommodate the field of view of said wide angle lens of said disposable camera when said disposable camera slides invertedly into a respective one of said end openings of said rear compartment, the bottom panel having a multiplicity of apertures and a detent section located between a respective two of the multiplicity of apertures, the detent section having a central cavity therethrough; (e) an elongated narrow trigger spring mounted within said step-down section of said rear compartment and having a tapering distal section with a narrow distal end, a wide middle section, and a tapering proximal section with a narrow proximal end, the proximal end located relative to said cover plate such that the middle section abuts against said bottom panel of said rear compartment, and the distal end located adjacent to an end opening on said cover plate; (f) a chamber located within said front compartment and covering said detent section, the chamber having a first end wall, a top wall with an opening and a second end wall; (g) a spherical rolling ball retained within said chamber and being able to roll on said detent section, where the rolling ball is limited to a horizontal plane movement and responsive to inertial forces; (h) a trigger lever arm pivotally mounted between said front panels of said front and rear compartments at a location remote from said chamber and having a distal end and a proximal end, the distal end forming a trigger lever pin extending down through said opening of said top wall of said chamber and resting on said rolling ball when said rolling ball is seating above said central cavity, the proximal end forming a reset trigger lever and resting above a respective one of said multiplicity apertures of said bottom panel of said front compartment and a transverse latching pin extending through an opening on said front panel of said rear compartment and into said rear compartment for latching said distal section of said trigger spring; (i) said reset trigger lever of said trigger lever arm facilitating the cocking of said tapering distal section of said trigger spring by latching said transverse latching pin of said trigger lever arm over said narrow distal end of said trigger spring to prevent said tapering distal section of said trigger spring from pressing up on said shutter release button lever of said camera prematurely when said apparatus is cocked; and (j) means for preventing said camera from sliding out from said end openings of said rear compartment, one of the means being disablable to allow insertion and retraction of said camera; (k) whereby when said impact activated camera triggering apparatus is mounted in said vehicle, said rolling ball can be moved off said central cavity of said detent section in response to said inertial forces in the horizontal plane upon sudden impact on said vehicle from any lateral direction, which drops said trigger lever pin of said trigger lever arm off from said rolling ball, causing said latching pin of said trigger lever arm to release said tapering distal section of said trigger spring which in turn presses on said shutter release button lever of said disposable camera, to thereby automatically take said photographic picture at the moment of sudden impact.

Defined broadly, the present invention is an impact activated triggering mechanism for use with a camera inside a vehicle, the camera has a shutter release button lever and a lens for taking a photographic picture, the impact activated triggering mechanism comprising: (a) a mounting case including a rear compartment for retaining said camera and a front compartment; (b) said rear compartment having a front panel with an opening therethrough, a rear panel, a bottom panel, a top panel, a first end opening, and a second end opening, the bottom panel having a step-down section and a cut-out opening located adjacent to the second end opening for accessing said shutter release button lever; (c) a cover plate mounted within said rear compartment and covering said step-down section of said rear compartment; (d) said front compartment having a front panel, a bottom panel, a first end opening, and a second end opening, the front panel having a slotted top end and an opening therethrough located centrally and aligned with and parallel to said opening of said front panel of said rear compartment, where both of the openings of the front panel of said front compartment and said front panel of said rear compartment accommodate the field of view of said lens of said camera when said camera slides invertedly into said second end opening of said rear compartment, the bottom panel having at least three apertures and a detent section located between a respective two of the at least three apertures, the detent section having a cavity therethrough; (e) a trigger spring mounted within said step-down section of said rear compartment and having a tapering distal section with a narrow distal end, a wide middle section, and a tapering proximal section with a narrow proximal end, the proximal end located relative to said cover plate such that the middle section abuts against said bottom panel of said rear compartment, and the distal end located adjacent to an end opening on said cover plate; (f) a chamber mounted within said front compartment and covering said detent section and having a first end wall, a top wall with an opening and a second end wall; (g) a rolling ball retained within said chamber and being able to roll on said detent section, where the rolling ball is limited to a horizontal plane movement and responsive to inertial forces; (h) a trigger lever arm pivotally mounted between said front panels of said front and rear compartments at a location remote front said chamber and having a distal end and a proximal end, the distal end forming a trigger lever pin extending down through said opening of said top wall of said chamber and resting on said rolling ball when said rolling ball is seating above said cavity, the proximal end forming a reset trigger lever and resting above a respective one of said at least three apertures of said bottom panel of said front compartment and a latching pin extending through an opening on said front panel of said rear compartment and into said rear compartment for latching said distal end of said trigger spring; and (i) said reset trigger lever of said trigger lever arm facilitating the cocking of said tapering distal section of said trigger spring by latching said latching pin of said trigger lever arm over said narrow distal end of said trigger spring to prevent said tapering distal section of said trigger spring from pressing up on said shutter release button lever of said camera prematurely; (j) whereby said rolling ball can be moved off from said cavity of said detent section in response to said inertial forces in the horizontal plane upon sudden impact on said vehicle from any lateral direction, which drops said trigger lever pin of said trigger lever arm off from said rolling ball, causing said latching pin of said trigger lever arm to release said tapering distal section of said trigger spring which in turn presses on said shutter release button lever of said camera, to thereby automatically take said photographic picture at the moment of sudden impact.

Defined more broadly, the present invention is a triggering mechanism for use with a camera inside a vehicle, the camera has a shutter release button lever and a lens for taking a photographic picture, the triggering mechanism comprising: (a) a mounting case including a rear compartment for retaining said camera and a front compartment; (b) said rear compartment having a front panel with an opening therethrough, a rear panel, a bottom panel and a top panel, the bottom panel having a step-down section; (c) a cover plate mounted within said rear compartment and covering said step-down section of said rear compartment; (d) said front compartment having a front panel with an opening therethrough and a bottom panel, where both of the openings of the front panels of said front and rear compartments accommodate the field of view of said lens of said camera when said camera is mounted within said rear compartment, the bottom panel having a detent section with a cavity therethrough; (e) means for attaching said mounting case inside said vehicle; (f) a trigger spring mounted within said step-down section of said rear compartment and having a distal section with a distal end, a middle section, and a proximal section with a proximal end, the proximal end located relative to said cover plate such that the middle section abuts against said bottom panel of said rear compartment, and the distal section being loaded; (g) a chamber mounted within said front compartment and covering said detent section, the chamber having an opening therethrough; (h) a rolling mass retained within said chamber and being able to roll on said detent section, where the rolling mass is limited to a horizontal plane movement and responsive to inertial forces; (i) a trigger lever arm pivotally mounted between said front panels of said front and rear compartments at a location remote from said chamber and having a distal end forming a trigger lever pin extending down through said opening of said chamber and resting on said rolling mass when said rolling mass is located above said cavity and a proximal end forming a reset trigger lever and a latching pin extending into said rear compartment for loading said distal end of said trigger spring; and (j) said reset trigger lever of said trigger lever arm facilitating the cocking of said distal section of said trigger spring by latching said latching pin of said trigger lever arm over said distal end of said trigger spring to prevent said distal section of said trigger spring from pressing up on said shutter release button lever of said camera prematurely; (k) whereby said rolling mass can be moved off from said cavity of said detent section in response to said inertial forces in the horizontal plane upon sudden impact on said vehicle from any direction, which drops said trigger lever pin of said trigger lever arm off from said rolling mass, causing said latching pin of said trigger lever arm to release said distal section of said trigger spring which in turn presses on said shutter release button lever of said camera, to thereby automatically take said photographic picture at the moment of sudden impact.

Defined even more broadly, the present invention is a triggering mechanism for use with a visual image recording device which has an element whose motion initiates operation and is removably mounted within a vehicle, the triggering mechanism comprising: (a) a seismic mass limited to small movements essentially in a horizontal plane and responsive to inertial forces; (b) a trigger spring having a distal end and a proximal end being fixedly located relative to said visual image recording device when said device is mounted within said vehicle, where the distal end is loaded and induces motion of said element of said visual image recording device, whose motion initiates operation, when it is released; (c) means for maintaining the position of said seismic mass relative to said visual image recording device in the absence of an acceleration in excess of a desired threshold value; and (d) a trigger lever arm having a distal end, a proximal end and a pivot axis, the trigger lever arm pivoted about the pivot axis relative to said visual image recording device when said device is mounted within said vehicle, the distal end forming a trigger lever pin resting on said seismic mass when said seismic mass is in the position in which it is maintained by said means for maintaining the position of said seismic mass and the proximal end forming a latching pin, which loads said distal end of said trigger spring; (e) whereby in response to said acceleration in excess of the desired threshold induced by a sudden impact on said vehicle from any direction, said seismic mass is moved relative to said visual image recording device essentially in the horizontal plane from the position in which it is maintained by said means for maintaining the position of said seismic mass, which drops said trigger lever pin off from said seismic mass, allowing said trigger spring to rotate said trigger lever arm, casing said latching pin to release said distal end of said trigger spring, which moves said element of said visual image recording device that initiates operation of said visual image recording device, to thereby automatically record a visual image at the moment of sudden impact.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An impact activated camera triggering apparatus used in combination with a disposable camera which has a wide angle lens and a shutter release button lever for taking a photographic picture, the apparatus removably attached inside a vehicle at a location between a back of a rear-view mirror and a front windshield, the rear-view mirror has a mirror side, the apparatus comprising:

a. a mounting case including a generally rectangular shaped rear compartment for retaining said camera and a generally right triangular shaped front compartment;

b. said rear compartment having a bowed shaped front panel with an elliptical shaped opening therethrough, a bowed shaped rear panel, a bottom panel, a top panel, a first end opening, and an opposite second end opening, the bowed shaped front and rear panels facing each other for securely locating said camera, the bottom panel having a longitudinal step-down section and a cut-out opening located adjacent to the second end opening for accessing said shutter release button lever and grasping said camera for insertion and removal;

c. a longitudinal cover plate mounted within said rear compartment and covering said step-down section of said rear compartment;

d. said front compartment having a slanted front panel, a bottom panel, a first end opening, and an opposite second end opening, the slanted front panel having a slotted top end and an elliptical shaped opening therethrough located centrally and aligned with and parallel to said opening of said front panel of said rear compartment, where both of the openings of the slanted front panel of said front compartment and said front panel of said rear compartment accommodate the field of view of said wide angle lens of said disposable camera when said disposable camera slides invertedly into a respective one of said end openings of said rear compartment, the bottom panel having a multiplicity of apertures and a detent section located between a respective two of the multiplicity of apertures, the detent section having a central cavity therethrough;

e. a longitudinal elongated trigger spring mounted within said step-down section of said rear compartment and having a tapering distal section with a narrow distal end, a wide middle section, and a tapering proximal section with a narrow proximal end, the proximal end located relative to said cover plate such that the middle section abuts against said bottom panel of said rear compartment, and the distal end located adjacent to an end opening on said cover plate;

f. a chamber located within said front compartment and covering said detent section, the chamber having a first end wall, a top wall with an opening and a second end wall;

g. a spherical rolling ball retained within said chamber and being able to roll on said detent section, where the rolling ball is limited to a horizontal plane movement and responsive to inertial forces;

h. a trigger lever arm pivotally mounted between said front panels of said front and rear compartments at a location remote from said chamber and having a distal end and a proximal end, the distal end forming a trigger lever pin extending down through said opening of said top wall of said chamber and resting on said rolling ball when said rolling ball is seating above said central cavity, the proximal end forming a reset trigger lever and resting above a respective one of said multiplicity apertures of said bottom panel of said front compartment and a transverse latching pin extending through an opening on said front panel of said rear compartment and into said rear compartment for latching said distal section of said trigger spring;

i. said reset trigger lever of said trigger lever arm facilitating the cocking of said tapering distal section of said trigger spring by latching said transverse latching pin of said trigger lever arm over said narrow distal end of said trigger spring to prevent said tapering distal section of said trigger spring from pressing up on said shutter release button lever of said camera prematurely when said apparatus is cocked; and j. means for preventing said camera from sliding out from said end openings of said rear compartment, one of the means being disablable to allow insertion and retraction of said camera;

k. whereby when said impact activated camera triggering apparatus is mounted in said vehicle, said rolling ball can be moved off said central cavity of said detent section in response to said inertial forces in the horizontal plane upon sudden impact on said vehicle from any lateral direction, which drops said trigger lever pin of said trigger lever arm off from said rolling ball, causing said latching pin of said trigger lever arm to release said tapering distal section of said trigger spring which in turn presses on said shutter release button lever of said disposable camera, to thereby automatically take said photographic picture at the moment of sudden impact.

2. The apparatus in accordance with claim 1 wherein the sensitively can be adjusted by changing the weight of said rolling ball relative to the spring load.

3. The apparatus in accordance with claim 1 wherein the sensitively can be adjusted by changing the diameter of said central cavity of said detent section relative to the diameter of said rolling ball.

4. The apparatus in accordance with claim 1 wherein the sensitivity can be adjusted by changing the horizontal projection of the length of said trigger lever arm from its pivot to said rolling ball relative to the distance between the pivot and the normal to said distal end of said trigger spring at said latching pin.

5. The apparatus in accordance with claim 1 wherein said disposable camera can be readily removed from said mounting case for conventional manual operation.

6. The apparatus in accordance with claim 1 wherein said mounting case further comprises indexing means for locating said apparatus relative to the reflective face of said rear view mirror.

7. The apparatus in accordance with claim 6 wherein said indexing means locating said mounting case to said mirror side of said rear-view mirror is preloaded with elastic bands.

8. The apparatus in accordance with claim 1 wherein said means for preventing said camera from sliding out from said end openings of said rear compartment comprises at least two opposite flanges mounted on each end of said rear panel of said rear compartment, where one of the at least two opposite flanges being flexible for allowing insertion or retraction of said camera.

9. An impact activated triggering mechanism for use with a camera inside a vehicle, the camera has a shutter release button lever and a lens for taking a photographic picture, the impact activated triggering mechanism comprising:

a. a mounting case including a rear compartment for retaining said camera and a front compartment;

b. said rear compartment having a front panel with an opening therethrough, a rear panel, a bottom panel, a top panel, a first end opening, and a second end opening, the bottom panel having a step-down section and a cut-out opening located adjacent to the second end opening for accessing said shutter release button lever;

c. a cover plate mounted within said rear compartment and covering said step-down section of said rear compartment;

d. said front compartment having a front panel, a bottom panel, a first end opening, and a second end opening, the front panel having a slotted top end and an opening therethrough located centrally and aligned with and parallel to said opening of said front panel of said rear compartment, where both of the openings of the front panel of said front compartment and said front panel of said rear compartment accommodate the field of view of said lens of said camera when said camera slides invertedly into said second end opening of said rear compartment, the bottom panel having at least three apertures and a detent section located between a respective two of the at least three apertures, the detent section having a cavity therethrough;

e. a trigger spring mounted within said step-down section of said rear compartment and having a tapering distal section with a narrow distal end, a wide middle section, and a tapering proximal section with a narrow proximal end, the proximal end located relative to said cover plate such that the middle section abuts against said bottom panel of said rear compartment, and the distal end located adjacent to an end opening on said cover plate;

f. a chamber mounted within said front compartment and covering said detent section and having a first end wall, a top wall with an opening and a second end wall;

g. a rolling ball retained within said chamber and being able to roll on said detent section, where the rolling ball is limited to a horizontal plane movement and responsive to inertial forces;

h. a trigger lever arm pivotally mounted between said front panels of said front and rear compartments at a location remote front said chamber and having a distal end and a proximal end, the distal end forming a trigger lever pin extending down through said opening of said top wall of said chamber and resting on said rolling ball when said rolling ball is seated above said cavity, the proximal end forming a reset trigger lever and resting above a respective one of said at least three apertures of said bottom panel of said front compartment and a latching pin extending through an opening on said front panel of said rear compartment and into said rear compartment for latching said distal end of said trigger spring; and i. said reset trigger lever of said trigger lever arm facilitating the cocking of said tapering distal section of said trigger spring by latching said latching pin of said trigger lever arm over said narrow distal end of said trigger spring to prevent said tapering distal section of said trigger spring from pressing up on said shutter release button lever of said camera prematurely;

j. whereby said rolling ball can be moved off from said cavity of said detent section in response to said inertial forces in the horizontal plane upon sudden impact on said vehicle from any lateral direction, which drops said trigger lever pin of said trigger lever arm off from said rolling ball, causing said latching pin of said trigger lever arm to release said tapering distal section of said trigger spring which in turn presses on said shutter release button lever of said camera, to thereby automatically take said photographic picture at the moment of sudden impact.

10. The impact activated triggering mechanism in accordance with claim 9 wherein the sensitively can be adjusted by changing the weight of said rolling ball relative to the spring load.

11. The impact activated triggering mechanism in accordance with claim 9 wherein the sensitively can be adjusted by changing the diameter of said cavity of said detent section relative to the diameter of said rolling ball.

12. The impact activated triggering mechanism in accordance with claim 9 wherein the sensitivity can be adjusted by changing the horizontal projection of the length of said trigger lever arm from its pivot to said rolling ball relative to the distance between the pivot and the normal to said distal end of said trigger spring at said latching pin.

13. The impact activated triggering mechanism in accordance with claim 9 wherein said camera can be readily removed from said mounting case for conventional manual operation.

14. The impact activated triggering mechanism in accordance with claim 9 wherein said camera is a disposable wide-angle camera.

15. The impact activated triggering mechanism in accordance with claim 9 further comprising means for attaching said mounting case inside said vehicle.

16. The impact activated triggering mechanism in accordance with claim 15 wherein said means for attaching said mounting case inside said vehicle comprises elastic bands.

17. The impact activated triggering mechanism in accordance with claim 16 wherein said elastic bands automatically preloads an indexing means attached to said mounting case against the mirror side of a rear-view mirror of said vehicle.

18. The impact activated triggering mechanism in accordance with claim 9 further comprising at least one flange mounted on a respective one of said end openings of said rear panel of said rear compartment to prevent said camera from sliding out from said end openings of said rear compartment.

19. A triggering mechanism for use with a camera inside a vehicle, the camera has a shutter release button lever and a lens for taking a photographic picture, the triggering mechanism comprising:

a. a mounting case including a rear compartment for retaining said camera and a front compartment;

b. said rear compartment having a front panel with an opening therethrough, a rear panel, a bottom panel and a top panel, the bottom panel having a step-down section;

c. a cover plate mounted within said rear compartment and covering said step-down section of said rear compartment;

d. said front compartment having a front panel with an opening therethrough and a bottom panel, where both of the openings of the front panels of said front and rear compartments accommodate the field of view of said lens of said camera when said camera is mounted within said rear compartment, the bottom panel having a detent section with a cavity therethrough;

e. means for attaching said mounting case inside said vehicle;

f. a trigger spring mounted within said step-down section of said rear compartment and having a distal section with a distal end, a middle section, and a proximal section with a proximal end, the proximal end located relative to said cover plate such that the middle section abuts against said bottom panel of said rear compartment, and the distal section being loaded;

g. a chamber mounted within said front compartment and covering said detent section, the chamber having an opening therethrough;

h. a rolling mass retained within said chamber and being able to roll on said detent section, where the rolling mass is limited to a horizontal plane movement and responsive to inertial forces;

i. a trigger lever arm pivotally mounted between said front panels of said front and rear compartments at a location remote from said chamber and having a distal end forming a trigger lever pin extending down through said opening of said chamber and resting on said rolling mass when said rolling mass is located above said cavity and a proximal end forming a reset trigger lever and a latching pin extending into said rear compartment for loading said distal end of said trigger spring; and j. said reset trigger lever of said trigger lever arm facilitating the cocking of said distal section of said trigger spring by latching said latching pin of said trigger lever arm over said distal end of said trigger spring to prevent said distal section of said trigger spring from pressing up on said shutter release button lever of said camera prematurely;

k. whereby said rolling mass can be moved off from said cavity of said detent section in response to said inertial forces in the horizontal plane upon sudden impact on said vehicle from any direction, which drops said trigger lever pin of said trigger lever arm off from said rolling mass, causing said latching pin of said trigger lever arm to release said distal section of said trigger spring which in turn presses on said shutter release button lever of said camera, to thereby automatically take said photographic picture at the moment of sudden impact.

20. The triggering mechanism in accordance with claim 19 wherein the sensitively can be adjusted by changing the weight of said rolling mass relative to the spring load.

21. The triggering mechanism in accordance with claim 19 wherein the sensitively can be adjusted by changing the diameter of said cavity of said detent section relative to the diameter of said rolling mass.

22. The triggering mechanism in accordance with claim 19 wherein the sensitivity can be adjusted by changing the horizontal projection of the length of said trigger lever arm from its pivot to said rolling mass relative to the distance between the pivot and the normal to said distal end of said trigger spring at said latching pin.

23. The triggering mechanism in accordance with claim 19 wherein said camera can be readily removed from said mounting case for conventional manual operation.

24. The triggering mechanism in accordance with claim 19 wherein said means for attaching said mounting case inside said vehicle further includes at least one elastic band.

25. The triggering mechanism in accordance with claim 24 wherein said at least one elastic band automatically preloads an indexing means attached to said mounting case against a mirror side of a rear-view mirror of said vehicle.

26. The triggering mechanism in accordance with claim 19 wherein said rolling mass comprises two spherical rolling balls stacked on top of each other.

27. The triggering mechanism in accordance with claim 19 wherein said rolling mass includes two spherical rolling balls and a cylindrical shaped hollow housing, where two spherical rolling balls are loosely retained within the cylindrical shaped hollow housing.

28. A triggering mechanism for use with a visual image recording device which has an element whose motion initiates operation and is removably mounted within a vehicle, the triggering mechanism comprising:

a. a seismic mass limited to small movements essentially in a horizontal plane and responsive to inertial forces;

b. a trigger spring having a distal end and a proximal end being fixedly located relative to said visual image recording device when said device is mounted within said vehicle, where the distal end is loaded and induces motion of said element of said visual image recording device, said motion of said element initiates operation when the distal end of the trigger spring is released;

c. means for maintaining the position of said seismic mass relative to said visual image recording device in the absence of any acceleration in excess of a desired threshold value, and for allowing non-sliding motion of said seismic mass relative to said visual image recording device in the presence of any acceleration in excess of said desired threshold value; and d. a trigger lever arm having a distal end, a proximal end and a pivot axis, the trigger lever arm pivoted about the pivot axis relative to said visual image recording device when said device is mounted within said vehicle, the distal end forming a trigger lever pin resting on said seismic mass when said seismic mass is in the position in which it is maintained by said means for maintaining the position of said seismic mass and the proximal end forming a latching pin, which loads said distal end of said trigger spring;

e. whereby in response to said acceleration in excess of the desired threshold induced by a sudden impact on said vehicle from any direction, said seismic mass is moved relative to said visual image recording device essentially in the horizontal plane from the position in which it is maintained by said means for maintaining the position of said seismic mass, which drops said trigger lever pin off from said seismic mass, allowing said trigger spring to rotate said trigger lever arm, causing said latching pin to release said distal end of said trigger spring, which moves said element of said visual image recording device that initiates operation of said visual image recording device, to thereby automatically record a visual image at the moment of sudden impact.

29. The triggering mechanism in accordance with claim 28 wherein said visual image recording device is a camera.

30. The triggering mechanism in accordance with claim 28 wherein the sensitively can be adjusted by changing the magnitude of the weight of said seismic mass relative to the spring load.

31. The triggering mechanism in accordance with claim 28 wherein the sensitivity can be adjusted by changing the horizontal projection of the length of said trigger lever arm from its pivot to said seismic mass relative to the distance between the pivot and the normal to said distal end of said trigger spring at said latching pin.

32. The triggering mechanism in accordance with claim 29 wherein said camera can be readily removed from said mounting case for conventional manual operation.

33. The triggering mechanism in accordance with claim 28 further comprising at least one elastic band for mounting said visual image recording device inside said vehicle.

34. The triggering mechanism in accordance with claim 33 wherein said at least one elastic band automatically preloads an indexing means fixed relative to said visual image recording device when said device is supported inside said vehicle against a mirror side of a rear-view mirror of said vehicle.

35. The triggering mechanism in accordance with claim 34 wherein said indexing means comprises three clips, each clip having a proximal end and a distal end, the proximal ends fixedly located relative to said visual image recording device when said device is mounted inside said vehicle, the distal ends forming hooks around the edge molding of the reflective face of said rear view mirror, whereby manually placing said visual image recording device between said rear view mirror and a windshield of said vehicle with said hooks around the reflective face edge molding, gradual release of said visual image recording device allows said at least one elastic band to preload the clips, mounting said visual image recording device within said vehicle rigidly and unambiguously normal to said mirror reflective surface independent of the back surface of said mirror.

36. The triggering mechanism in accordance with claim 28 wherein said element whose motion initiates operation of said visual image recording device is an external operation initiating button, where the motion of said distal end of said trigger spring toward the button induces motion of the button, which initiates operation of said visual image recording device.

37. The triggering mechanism in accordance with claim 28 wherein said element of said visual image recording device whose motion initiates operation is spring loaded to induce motion.

38. The triggering mechanism in accordance with claim 37 wherein said distal end of said trigger spring further comprises a lug which prevents motion of said spring loaded element of said visual image recording device in its cocked position, where the rotation of said trigger lever arm allows said spring loaded element to initiate operation of said visual image recording device.

39. The triggering mechanism in accordance with claim 28 further comprising a chamber for enclosing said seismic mass and having an essentially flat bottom, an opening in its upper surface, and a planform diameter sufficiently greater than the planform diameter of said seismic mass such that said trigger lever pin has sufficient clearance to drop to any side of its cocked position if said seismic mass moves relative to the chamber in the opposite direction, the chamber fixedly attached relative to said visual image recording device when said device is mounted within said vehicle such that said seismic mass is limited to small movements essentially in a horizontal plane, said distal end of said trigger lever arm enters the opening in the upper surface of the chamber with said trigger lever pin resting on said seismic mass and following an acceleration in excess of the required threshold said trigger lever pin drops off said seismic mass.

40. The triggering mechanism in accordance with claim 28 wherein said element whose motion initiates operation of said visual image recording device is an internal part of said visual image recording device and is spring loaded to induce motion, said motion is prevented by said trigger lever latching pin in the cocked configuration of said triggering mechanism, whereby motion of said trigger lever latching pin allows said spring loaded element to directly initiate operation of said visual image recording device integrated with said triggering mechanism.

41. The triggering mechanism in accordance with claim 28 wherein said visual image recording device is mounted between the rear view mirror and a windshield of said vehicle oriented with a generally forward field of view, where the field of view of said visual image recording device includes a scene whose visual image is useful to record in the event of an impact on said vehicle from any direction and there is minimal obstruction to the field of view of the driver of said vehicle.

42. The triggering mechanism in accordance with claim 28 wherein said element of said visual image recording device whose motion initiates operation can be readily triggered by manual pressure on said element.

43. The triggering mechanism in accordance with claim 28 further comprising means for initiating cocking of said triggering mechanism, where in response to a single finger thrust, the means for initiating cocking moves said triggering mechanism into its cocked configuration.

44. The triggering mechanism in accordance with claim 43 wherein said means for initiating cocking of said trigger mechanism further comprises:

a. a connecting bell-crank having a horizontal first arm terminating in a reset button, a second arm and a pivot axis, the bell-crank pivoted about the pivot axis relative to said visual image recording device, where the second arm extends upwardly to form a loop;

b. a reset trigger bell-crank having a horizontal lower arm, a vertical upper arm terminating in a link shaft and a pivot axis, the bell-crank pivoted about the pivot axis relative to said visual image recording device;

c. a reset tension element having a loop end and a delay link end, the loop end hooked to said loop on said second arm of said connecting bell-crank and the delay link end hooked to said link shaft on said vertical upper arm of said reset trigger bell-crank;

d. a spring link loosely connected to said trigger spring adjacent to said distal end of said trigger spring and to said horizontal lower arm of said reset trigger bell-crank;

e. a delay link loosely connected to a link shaft of said trigger lever arm and said link shaft of said reset trigger bell-crank, which does not engage the link shaft of said trigger lever arm until said distal end of said trigger spring is clear from said latching pin of said trigger lever arm; and f. means for relocating said seismic mass to the position in which it will be maintained by said means for maintaining the position of said seismic mass in the absence of an acceleration in excess of the desired threshold;

g. whereby pressing said reset button resets said triggering mechanism, said connecting bell-crank rotates until said loop of said connecting bell-crank pulls said reset tension element toward its loop end, which pulls said link shaft of said reset trigger bell-crank, rotating said reset trigger bell-crank, which causes said lower arm of said reset trigger bell-crank to move downward, lowering said spring link, which lowers said distal end of said trigger spring and clears said latching pin of said trigger lever arm, continued motion of said link shaft of said reset trigger bell-crank pulls said delay link, which pulls said link shaft of said trigger lever arm, which rotates said trigger lever arm, causing said latching pin of said trigger lever arm to abut against said distal end of said trigger spring and raises said trigger lever pin which clears said seismic mass, said means for relocating said seismic mass relocates said seismic mass to the position in which it is maintained in the absence of an acceleration in excess of the desired threshold, and release of said reset button relaxes loads in said connecting bell-crank, said reset tension element, said reset trigger bell-crank, said delay link, said trigger lever arm and said spring link, allowing said trigger spring to push said latching pin of said trigger lever arm, rotating said trigger lever arm, lowering said trigger lever pin to press on said seismic mass with the required preload.

45. The triggering mechanism in accordance with claim 44 wherein said seismic mass is a sliding mass with a central rod on its upper surface and a conical cavity on its base.

46. The triggering mechanism in accordance with claim 45 wherein said means for relocating said seismic mass to the position in which it will be maintained by said means for maintaining the position of said seismic mass in the absence of an acceleration in excess of the desired threshold is a cavity in the top of said central rod which can capture the tip of said trigger lever pin.

47. The triggering mechanism in accordance with claim 45 wherein said connecting bell-crank reset button comprises a cone shaped head on its upper surface, the head is located within a cavity of said sliding mass such that when said reset button is pressed upward after said trigger lever pin is raised above its cocked position on said central rod, which occurs prior to extending said reset tension element, where said reset tension element is a soft spring, said sliding mass is moved into the position in which it is maintained by the tip of said trigger lever pin in the cavity of said sliding mass and releasing said reset button returns it to its cocked position, said trigger spring rotates said trigger lever arm, preloading said trigger lever pin down into the cavity in said central rod, which maintains the position of said sliding mass in the absence of an acceleration in excess of the desired threshold value, said central rod providing clearance for said trigger lever pin to drop off with minimal horizontal motion of said sliding mass relative to said visual image recording device.

48. A triggering mechanism for use with a visual image recording device which has an element whose motion initiates operation and is removably mounted within a vehicle, the triggering mechanism comprising:

a. at least one rolling ball limited to small movements essentially in a horizontal plane and responsive to inertial forces;

b. a trigger spring having a distal end and a proximal end being fixedly located relative to said visual image recording device when said device is mounted within said vehicle, where the distal end is loaded and induces motion of said element of said visual image recording device, said motion of said element initiates operation when the distal end of the trigger spring is released; means for maintaining the position of said at least one rolling ball relative to said visual image recording device in the absence of an acceleration in excess of a desired threshold value; and d. a trigger lever arm having a distal end, a proximal end and a pivot axis, the trigger lever arm pivoted about the pivot axis relative to said visual image recording device when said device is mounted within said vehicle, the distal end forming a trigger lever pin resting on said at least one rolling ball when said at least one rolling ball is in the position in which it is maintained by said means for maintaining the position of said at least one rolling ball and the proximal end forming a latching pin, which loads said distal end of said trigger spring;

e. whereby in response to said acceleration in excess of the desired threshold induced by a sudden impact on said vehicle from any direction, said at least one rolling ball is moved relative to said visual image recording device essentially in the horizontal plane from the position in which it is maintained by said means for maintaining the position of said at least one rolling ball, which drops said trigger lever pin off from said at least one rolling ball, allowing said trigger spring to rotate said trigger lever arm, causing said latching pin to release said distal end of said trigger spring, which moves said element of said visual image recording device that initiates operation of said visual image recording device, to thereby automatically record a visual image at the moment of sudden impact.

49. The triggering mechanism in accordance with claim 48 wherein said at least one rolling ball comprises two rolling balls stacked one on top of the other.

50. The triggering mechanism in accordance with claim 49 wherein said at least one rolling ball comprises two rolling balls and an open ended cylindrical shaped hollow housing, where the two rolling balls are loosely retained within the cylindrical shaped hollow housing.

51. The triggering mechanism in accordance with claim 48 wherein said means for maintaining the position of said at least one rolling ball in the absence of an acceleration in excess of the desired threshold comprises one cavity for each of said at least one rolling ball, the cavity having an elliptical rim in contact with said at least one rolling ball, each cavity being fixedly located relative to said visual image recording device, where the cavity controls the threshold at which said at least one rolling ball moves from its cocked position, the threshold reduces as said at least one rolling ball moves out of said cavity providing reliable operation with negligible chance of termination once motion is initiated.

52. The triggering mechanism in accordance with claim 51 wherein the sensitively can be adjusted by changing the diameter of said rim of said cavity relative to the diameter of said at least one rolling ball.

53. The triggering mechanism in accordance with claim 51 wherein said cavity is located at the deepest part of a conical depression.

54. The triggering mechanism in accordance with claim 51 wherein said at least one rolling ball is a single rolling ball which is maintained in position by said cavity corresponding to the single rolling ball which is at the deepest part of a conical depression fixedly located relative to said visual image recording device, where the single rolling ball is relocated in the conical depression by gravity to the position in which it is maintained by said cavity.

55. The triggering mechanism in accordance with claim 54 wherein said proximal end of said trigger lever further comprises a reset arm which facilitates manual lever rotation of said trigger lever arm to cause said latching pin of said trigger lever arm to abut against said distal end of said trigger spring and to provide clearance for said single rolling ball to relocate, thereby releasing of the reset arm allows said trigger spring to raise said latching pin and rotates said trigger lever arm, lowering said trigger lever pin to push on said single rolling ball with the required preload completing the cocking of said triggering mechanism.

* * * * *